(12) United States Patent
Duke et al.

(10) Patent No.: US 12,154,102 B2
(45) Date of Patent: *Nov. 26, 2024

(54) PAYMENT VEHICLE WITH ON AND OFF FUNCTION

(71) Applicant: Wells Fargo Bank, N.A., San Francisco, CA (US)

(72) Inventors: Michael T. Duke, Monroe, NC (US); Dean Patrick Nolan, Charlotte, NC (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/143,737

(22) Filed: May 5, 2023

(65) Prior Publication Data

US 2023/0274265 A1 Aug. 31, 2023

Related U.S. Application Data

(63) Continuation of application No. 17/397,532, filed on Aug. 9, 2021, now Pat. No. 11,676,136, which is a continuation of application No. 16/719,419, filed on Dec. 18, 2019, now Pat. No. 11,100,495, which is a continuation of application No. 13/829,640, filed on Mar. 14, 2013, now Pat. No. 10,867,298, which is a (Continued)

(51) Int. Cl.
 *G06Q 20/38* (2012.01)
(52) U.S. Cl.
 CPC .................. *G06Q 20/382* (2013.01)

(58) Field of Classification Search
None
See application file for complete search history.

(56) References Cited

U.S. PATENT DOCUMENTS 2,751,554 A 6/1956 Schlesinger et al.
5,485,510 A 1/1996 Colbert
(Continued)

FOREIGN PATENT DOCUMENTS

AU 2015255170 A1 11/2015
AU 2016285320 A1 1/2017
(Continued)

OTHER PUBLICATIONS

Other USPTO Comm. with Refs. on US Dtd Nov. 22, 2023.
(Continued)

*Primary Examiner* — Christopher Bridges
(74) *Attorney, Agent, or Firm* — Foley & Lardner LLP

(57) ABSTRACT

A computer system and method for enabling or disabling a payment vehicle at the request of a payment card holder from a remote device. The computer system comprises a computer having memory and a processor for processing input data received from a remote device. The input data comprises an instruction executable by the processor in a form of a text message or electronic mail received from the remote device, with the instruction to enable or disable a payment card of a payment card holder by changing the status of the payment card. An interactive remote interface computer software application is provided to the payment card holder for use on the remote or other device.

20 Claims, 13 Drawing Sheets

Related U.S. Application Data continuation-in-part of application No. 12/316,996, filed on Dec. 18, 2008, now abandoned.

(60) Provisional application No. 61/197,872, filed on Oct. 31, 2008.

(56) References Cited

U.S. PATENT DOCUMENTS

| | | | |
|---|---|---|---|
| 5,573,457 A | 11/1996 | Watts et al. | |
| 5,737,423 A | 4/1998 | Manduley | |
| 5,953,710 A * | 9/1999 | Fleming | G06Q 20/405 |
| | | | 235/380 |
| 5,999,978 A | 12/1999 | Angal et al. | |
| 6,047,268 A | 4/2000 | Bartoli et al. | |
| 6,105,006 A * | 8/2000 | Davis | G06Q 20/108 |
| | | | 705/40 |
| 6,188,309 B1 | 2/2001 | Levine | |
| 6,193,152 B1 | 2/2001 | Fernando et al. | |
| 6,408,330 B1 | 6/2002 | Delahuerga | |
| 6,422,462 B1 * | 7/2002 | Cohen | G07F 7/025 |
| | | | 705/41 |
| 6,494,367 B1 | 12/2002 | Zacharias | |
| 6,575,361 B1 * | 6/2003 | Graves | G06Q 20/085 |
| | | | 235/379 |
| 6,717,592 B2 | 4/2004 | Gusler et al. | |
| 6,845,906 B2 * | 1/2005 | Royer | G06Q 20/227 |
| | | | 235/379 |
| 6,865,547 B1 * | 3/2005 | Brake, Jr. | G06Q 30/0601 |
| | | | 705/26.1 |
| 6,879,965 B2 | 4/2005 | Fung et al. | |
| 6,910,021 B2 | 6/2005 | Brown et al. | |
| 6,931,382 B2 * | 8/2005 | Laage | G06Q 20/382 |
| | | | 705/64 |
| 6,980,969 B1 | 12/2005 | Tuchler et al. | |
| 7,014,107 B2 | 3/2006 | Singer et al. | |
| 7,016,877 B1 | 3/2006 | Steele et al. | |
| 7,107,243 B1 | 9/2006 | McDonald et al. | |
| 7,155,411 B1 | 12/2006 | Blinn et al. | |
| 7,219,833 B2 | 5/2007 | Cantini et al. | |
| 7,225,156 B2 | 5/2007 | Fisher et al. | |
| 7,249,099 B2 | 7/2007 | Ling | |
| 7,264,154 B2 | 9/2007 | Harris | |
| 7,319,986 B2 | 1/2008 | Praisner et al. | |
| 7,331,518 B2 | 2/2008 | Rable | |
| 7,347,361 B2 | 3/2008 | Lovett | |
| 7,359,880 B2 | 4/2008 | Abel et al. | |
| 7,383,988 B2 | 6/2008 | Slonecker, Jr. | |
| 7,383,998 B2 | 6/2008 | Parker et al. | |
| 7,392,224 B1 | 6/2008 | Bauer et al. | |
| 7,398,248 B2 | 7/2008 | Phillips et al. | |
| 7,401,731 B1 * | 7/2008 | Pletz | G06Q 40/03 |
| | | | 235/375 |
| 7,413,113 B1 | 8/2008 | Zhu | |
| 7,451,395 B2 | 11/2008 | Brants et al. | |
| 7,512,563 B2 | 3/2009 | Likourezos et al. | |
| 7,552,088 B2 | 6/2009 | Malcolm | |
| 7,571,142 B1 | 8/2009 | Flitcroft et al. | |
| 7,587,365 B2 | 9/2009 | Malik et al. | |
| 7,594,258 B2 | 9/2009 | Mao et al. | |
| 7,653,597 B1 | 1/2010 | Stevanovski et al. | |
| 7,685,037 B2 | 3/2010 | Reiners et al. | |
| 7,689,502 B2 | 3/2010 | Lilly et al. | |
| 7,698,221 B2 | 4/2010 | Blinn et al. | |
| 7,707,082 B1 | 4/2010 | Lapstun et al. | |
| 7,712,655 B2 * | 5/2010 | Wong | H04M 11/007 |
| | | | 235/382 |
| 7,740,170 B2 * | 6/2010 | Singh | C08G 18/83 |
| | | | 705/76 |
| 7,753,265 B2 * | 7/2010 | Harris | G06Q 20/40 |
| | | | 235/382 |
| 7,778,932 B2 | 8/2010 | Yan | |
| 7,818,319 B2 | 10/2010 | Henkin et al. | |
| 7,857,212 B1 | 12/2010 | Matthews | |
| 7,873,573 B2 | 1/2011 | Realini | |
| 7,930,228 B1 * | 4/2011 | Hawkins | G06Q 40/04 |
| | | | 705/7.38 |
| 7,937,325 B2 | 5/2011 | Kumar et al. | |
| 7,941,534 B2 | 5/2011 | De La Huerga | |
| 7,949,572 B2 | 5/2011 | Perrochon et al. | |
| 7,954,704 B1 | 6/2011 | Gephart et al. | |
| 8,090,346 B2 | 1/2012 | Cai | |
| 8,099,109 B2 | 1/2012 | Altman et al. | |
| 8,127,982 B1 | 3/2012 | Casey et al. | |
| 8,160,933 B2 | 4/2012 | Nguyen et al. | |
| 8,175,938 B2 | 5/2012 | Olliphant et al. | |
| 8,196,131 B1 | 6/2012 | Von Behren et al. | |
| 8,245,909 B2 | 8/2012 | Pletz et al. | |
| 8,249,983 B2 | 8/2012 | Dilip et al. | |
| 8,255,323 B1 | 8/2012 | Casey et al. | |
| 8,266,031 B2 | 9/2012 | Norris et al. | |
| 8,266,205 B2 | 9/2012 | Hammad et al. | |
| 8,280,786 B1 | 10/2012 | Weiss et al. | |
| 8,280,788 B2 | 10/2012 | Perlman | |
| 8,296,228 B1 | 10/2012 | Kloor | |
| 8,297,502 B1 | 10/2012 | McGhie et al. | |
| 8,301,566 B2 | 10/2012 | Mears | |
| 8,332,294 B1 | 12/2012 | Thearling | |
| 8,359,531 B2 | 1/2013 | Grandison et al. | |
| 8,360,952 B2 | 1/2013 | Wissman et al. | |
| 8,364,556 B2 | 1/2013 | Nguyen et al. | |
| 8,396,808 B2 | 3/2013 | Greenspan | |
| 8,407,136 B2 | 3/2013 | Bard et al. | |
| 8,407,142 B1 | 3/2013 | Griggs | |
| 8,423,349 B1 | 4/2013 | Huynh et al. | |
| 8,473,394 B2 | 6/2013 | Marshall | |
| 8,489,761 B2 | 7/2013 | Pope et al. | |
| 8,489,894 B2 | 7/2013 | Comrie et al. | |
| 8,543,506 B2 | 9/2013 | Grandcolas et al. | |
| 8,589,335 B2 | 11/2013 | Smith et al. | |
| 8,595,074 B2 | 11/2013 | Sharma et al. | |
| 8,595,098 B2 | 11/2013 | Starai et al. | |
| 8,625,838 B2 | 1/2014 | Song et al. | |
| 8,630,952 B2 | 1/2014 | Menon | |
| 8,635,687 B2 | 1/2014 | Binder | |
| 8,639,629 B1 | 1/2014 | Hoffman | |
| 8,655,310 B1 | 2/2014 | Katzer et al. | |
| 8,655,719 B1 | 2/2014 | Li et al. | |
| 8,660,926 B1 | 2/2014 | Wehunt et al. | |
| 8,666,411 B2 | 3/2014 | Tokgoz et al. | |
| 8,682,753 B2 | 3/2014 | Kulathungam | |
| 8,682,802 B1 | 3/2014 | Kannanari | |
| 8,700,729 B2 | 4/2014 | Dua | |
| 8,706,625 B2 | 4/2014 | Vicente et al. | |
| 8,712,839 B2 | 4/2014 | Steinert et al. | |
| 8,725,601 B2 | 5/2014 | Ledbetter et al. | |
| 8,762,211 B2 | 6/2014 | Killian et al. | |
| 8,762,237 B2 | 6/2014 | Monasterio et al. | |
| 8,768,838 B1 | 7/2014 | Hoffman | |
| 8,781,957 B2 | 7/2014 | Jackson et al. | |
| 8,781,963 B1 | 7/2014 | Feng et al. | |
| 8,793,190 B2 | 7/2014 | Johns et al. | |
| 8,794,972 B2 | 8/2014 | Lopucki | |
| 8,851,369 B2 | 10/2014 | Bishop et al. | |
| 8,868,458 B1 | 10/2014 | Starbuck et al. | |
| 8,868,666 B1 | 10/2014 | Hellwege et al. | |
| 8,880,047 B2 | 11/2014 | Konicek et al. | |
| 8,887,997 B2 * | 11/2014 | Barret | G06Q 20/385 |
| | | | 235/375 |
| 8,910,304 B2 | 12/2014 | Tsujimoto | |
| 8,924,288 B1 | 12/2014 | Easley et al. | |
| 8,925,099 B1 | 12/2014 | Saxe et al. | |
| 8,954,839 B2 | 2/2015 | Sharma et al. | |
| 9,043,609 B2 | 5/2015 | Calman | |
| 9,076,134 B2 | 7/2015 | Grovit et al. | |
| 9,105,021 B2 | 8/2015 | Tobin | |
| 9,195,984 B1 | 11/2015 | Spector et al. | |
| 9,256,871 B2 | 2/2016 | Anderson et al. | |
| 9,256,904 B1 | 2/2016 | Haller et al. | |
| 9,305,155 B1 | 4/2016 | Vo et al. | |
| 9,351,193 B2 | 5/2016 | Raleigh et al. | |
| 9,372,849 B2 | 6/2016 | Gluck et al. | |
| 9,390,417 B2 | 7/2016 | Song et al. | |
| 9,396,491 B2 | 7/2016 | Isaacson et al. | |

(56) References Cited

U.S. PATENT DOCUMENTS

| | | |
|---|---|---|
| 9,444,824 B1 | 9/2016 | Balazs et al. |
| 9,489,694 B2 | 11/2016 | Haller et al. |
| 9,514,456 B2 | 12/2016 | England et al. |
| 9,519,934 B2 | 12/2016 | Calman et al. |
| 9,524,525 B2* | 12/2016 | Manyam ............ G06Q 40/08 |
| 9,558,478 B2 | 1/2017 | Zhao |
| 9,569,473 B1 | 2/2017 | Holenstein et al. |
| 9,569,766 B2 | 2/2017 | Kneen |
| 9,576,318 B2 | 2/2017 | Caldwell |
| 9,646,300 B1 | 5/2017 | Zhou et al. |
| 9,647,855 B2 | 5/2017 | Deibert et al. |
| 9,690,621 B2 | 6/2017 | Kim et al. |
| 9,699,610 B1 | 7/2017 | Chicoine et al. |
| 9,710,566 B2 | 7/2017 | Ainslie et al. |
| 9,740,543 B1 | 8/2017 | Savage et al. |
| 9,775,029 B2 | 9/2017 | Lopez |
| 9,792,636 B2 | 10/2017 | Milne |
| 9,792,648 B1 | 10/2017 | Haller et al. |
| 9,849,364 B2 | 12/2017 | Tran et al. |
| 9,853,959 B1 | 12/2017 | Kapczynski et al. |
| 9,858,405 B2 | 1/2018 | Ranadive et al. |
| 9,858,576 B2 | 1/2018 | Song et al. |
| 9,978,046 B2 | 5/2018 | Lefebvre et al. |
| 9,996,837 B2 | 6/2018 | Siddens et al. |
| 10,032,146 B2 | 7/2018 | Caldwell |
| 10,044,501 B1 | 8/2018 | Bradley et al. |
| 10,044,647 B1 | 8/2018 | Karp et al. |
| 10,050,779 B2 | 8/2018 | Alness et al. |
| 10,055,747 B1 | 8/2018 | Sherman et al. |
| 10,096,006 B2 | 10/2018 | Loevenguth et al. |
| 10,096,043 B1 | 10/2018 | Beck et al. |
| 10,097,356 B2 | 10/2018 | Zinder |
| 10,115,155 B1 | 10/2018 | Haller et al. |
| 10,152,756 B2 | 12/2018 | Isaacson et al. |
| 10,157,420 B2 | 12/2018 | Narayana et al. |
| 10,187,483 B2 | 1/2019 | Golub et al. |
| 10,204,327 B2 | 2/2019 | Katzin et al. |
| 10,216,548 B1 | 2/2019 | Zhang et al. |
| 10,250,453 B1 | 4/2019 | Singh et al. |
| 10,275,602 B2 | 4/2019 | Bjorn et al. |
| 10,282,741 B2 | 5/2019 | Yu et al. |
| 10,359,915 B2 | 7/2019 | Asai |
| 10,373,129 B1 | 8/2019 | James et al. |
| 10,402,817 B1 | 9/2019 | Benkreira et al. |
| 10,402,818 B2 | 9/2019 | Zarakas et al. |
| 10,417,396 B2 | 9/2019 | Bawa et al. |
| 10,423,948 B1 | 9/2019 | Wilson et al. |
| 10,438,290 B1 | 10/2019 | Winklevoss et al. |
| 10,445,152 B1 | 10/2019 | Zhang et al. |
| 10,460,395 B2 | 10/2019 | Grassadonia |
| 10,521,798 B2 | 12/2019 | Song et al. |
| 10,592,882 B1 | 3/2020 | Viswanath et al. |
| 10,614,478 B1 | 4/2020 | Georgi |
| 10,650,448 B1 | 5/2020 | Haller et al. |
| 10,657,503 B1 | 5/2020 | Ebersole et al. |
| 10,742,655 B2 | 8/2020 | Taylor et al. |
| 10,872,005 B1 | 12/2020 | Killis |
| 10,878,496 B1 | 12/2020 | Duong et al. |
| 10,936,711 B2 | 3/2021 | Jain et al. |
| 10,963,589 B1 | 3/2021 | Fakhraie et al. |
| 10,992,679 B1 | 4/2021 | Fakhraie et al. |
| 11,107,561 B2 | 8/2021 | Matthieu et al. |
| 11,144,903 B2 | 10/2021 | Ready et al. |
| 11,151,529 B1 | 10/2021 | Nolte et al. |
| 11,200,569 B1 | 12/2021 | James et al. |
| 2001/0001856 A1 | 5/2001 | Gould et al. |
| 2001/0032183 A1 | 10/2001 | Landry |
| 2001/0051920 A1 | 12/2001 | Joao et al. |
| 2001/0056398 A1 | 12/2001 | Scheirer |
| 2002/0016749 A1 | 2/2002 | Borecki et al. |
| 2002/0035539 A1 | 3/2002 | O'Connell |
| 2002/0038289 A1 | 3/2002 | Lawlor et al. |
| 2002/0062249 A1 | 5/2002 | Iannacci |
| 2002/0095386 A1 | 7/2002 | Maritzen et al. |
| 2002/0143655 A1 | 10/2002 | Elston et al. |
| 2002/0169720 A1 | 11/2002 | Wilson et al. |
| 2003/0046246 A1 | 3/2003 | Klumpp et al. |
| 2003/0055786 A1 | 3/2003 | Smith et al. |
| 2003/0061163 A1 | 3/2003 | Durfield |
| 2003/0097331 A1 | 5/2003 | Cohen |
| 2003/0172040 A1 | 9/2003 | Kemper et al. |
| 2003/0195847 A1 | 10/2003 | Felger |
| 2003/0200179 A1 | 10/2003 | Kwan |
| 2003/0216997 A1 | 11/2003 | Cohen |
| 2003/0217001 A1 | 11/2003 | McQuaide et al. |
| 2004/0054564 A1 | 3/2004 | Fonseca et al. |
| 2004/0054591 A1 | 3/2004 | Spaeth et al. |
| 2004/0073903 A1 | 4/2004 | Melchione et al. |
| 2004/0078325 A1 | 4/2004 | O'Connor |
| 2004/0090825 A1 | 5/2004 | Nam et al. |
| 2004/0128243 A1 | 7/2004 | Kavanagh et al. |
| 2004/0143632 A1 | 7/2004 | McCarty |
| 2004/0148259 A1* | 7/2004 | Reiners ............ G06Q 20/10 |
| | | 705/42 |
| 2004/0178907 A1 | 9/2004 | Cordoba |
| 2004/0225606 A1 | 11/2004 | Nguyen et al. |
| 2004/0249710 A1 | 12/2004 | Smith et al. |
| 2004/0249753 A1 | 12/2004 | Blinn et al. |
| 2004/0263901 A1 | 12/2004 | Critelli et al. |
| 2005/0010483 A1 | 1/2005 | Ling |
| 2005/0014705 A1 | 1/2005 | Cheng et al. |
| 2005/0027431 A1 | 2/2005 | Todoroki et al. |
| 2005/0039041 A1 | 2/2005 | Shaw et al. |
| 2005/0060233 A1 | 3/2005 | Bonalle et al. |
| 2005/0114705 A1 | 5/2005 | Reshef et al. |
| 2005/0131815 A1 | 6/2005 | Fung et al. |
| 2005/0171898 A1 | 8/2005 | Bishop et al. |
| 2005/0199714 A1 | 9/2005 | Brandt et al. |
| 2005/0205662 A1 | 9/2005 | Nelson |
| 2005/0224587 A1 | 10/2005 | Shin et al. |
| 2005/0228750 A1 | 10/2005 | Olliphant et al. |
| 2005/0273431 A1 | 12/2005 | Abel et al. |
| 2006/0046742 A1 | 3/2006 | Zhang |
| 2006/0046745 A1 | 3/2006 | Davidson |
| 2006/0059110 A1 | 3/2006 | Madhok et al. |
| 2006/0178986 A1 | 8/2006 | Giordano et al. |
| 2006/0184456 A1 | 8/2006 | De Janasz |
| 2006/0190374 A1 | 8/2006 | Sher |
| 2006/0202012 A1 | 9/2006 | Grano et al. |
| 2006/0206912 A1 | 9/2006 | Klarfeld et al. |
| 2006/0235795 A1 | 10/2006 | Johnson et al. |
| 2006/0278698 A1 | 12/2006 | Lovett |
| 2007/0051797 A1 | 3/2007 | Randolph-Wall et al. |
| 2007/0083463 A1 | 4/2007 | Kraft |
| 2007/0100773 A1 | 5/2007 | Wallach |
| 2007/0112673 A1 | 5/2007 | Protti |
| 2007/0123305 A1 | 5/2007 | Chen et al. |
| 2007/0143831 A1 | 6/2007 | Pearson et al. |
| 2007/0203836 A1 | 8/2007 | Dodin |
| 2007/0226086 A1 | 9/2007 | Bauman et al. |
| 2007/0255653 A1* | 11/2007 | Tumminaro ........ G06Q 20/3255 |
| | | 705/39 |
| 2007/0266257 A1 | 11/2007 | Camaisa et al. |
| 2008/0000052 A1 | 1/2008 | Hong et al. |
| 2008/0005037 A1 | 1/2008 | Hammad et al. |
| 2008/0017702 A1 | 1/2008 | Little et al. |
| 2008/0021787 A1 | 1/2008 | MacKouse |
| 2008/0029608 A1 | 2/2008 | Kellum et al. |
| 2008/0052226 A1 | 2/2008 | Agarwal et al. |
| 2008/0066185 A1 | 3/2008 | Lester et al. |
| 2008/0086398 A1 | 4/2008 | Parlotto |
| 2008/0115104 A1 | 5/2008 | Quinn |
| 2008/0149706 A1 | 6/2008 | Brown et al. |
| 2008/0154772 A1 | 6/2008 | Carlson |
| 2008/0170156 A1 | 7/2008 | Kim |
| 2008/0191878 A1 | 8/2008 | Abraham |
| 2008/0208726 A1 | 8/2008 | Tsantes et al. |
| 2008/0226142 A1 | 9/2008 | Pennella et al. |
| 2008/0229383 A1 | 9/2008 | Buss et al. |
| 2008/0244724 A1 | 10/2008 | Choe et al. |
| 2008/0260119 A1 | 10/2008 | Marathe et al. |
| 2008/0283590 A1 | 11/2008 | Oder et al. |
| 2008/0301043 A1 | 12/2008 | Unbehagen |
| 2008/0319889 A1 | 12/2008 | Hammad et al. |

(56) References Cited

U.S. PATENT DOCUMENTS

| | | |
|---|---|---|
| 2009/0005269 A1 | 1/2009 | Martin et al. |
| 2009/0007231 A1 | 1/2009 | Kaiser et al. |
| 2009/0012898 A1 | 1/2009 | Sharma et al. |
| 2009/0055269 A1 | 2/2009 | Baron |
| 2009/0055642 A1 | 2/2009 | Myers et al. |
| 2009/0089113 A1 | 4/2009 | Rousso et al. |
| 2009/0112763 A1 | 4/2009 | Scipioni et al. |
| 2009/0132351 A1 | 5/2009 | Gibson |
| 2009/0164324 A1 | 6/2009 | Bishop et al. |
| 2009/0205014 A1 | 8/2009 | Doman et al. |
| 2009/0228381 A1 | 9/2009 | Mik et al. |
| 2009/0254447 A1 | 10/2009 | Blades |
| 2009/0254971 A1 | 10/2009 | Herz et al. |
| 2009/0287603 A1 | 11/2009 | Lamar et al. |
| 2009/0319638 A1 | 12/2009 | Faith et al. |
| 2010/0036769 A1 | 2/2010 | Winters et al. |
| 2010/0036906 A1 | 2/2010 | Song et al. |
| 2010/0063906 A1 | 3/2010 | Nelsen et al. |
| 2010/0082445 A1 | 4/2010 | Hodge et al. |
| 2010/0082487 A1 | 4/2010 | Nelsen |
| 2010/0094735 A1 | 4/2010 | Reynolds et al. |
| 2010/0100470 A1 | 4/2010 | Buchanan et al. |
| 2010/0114768 A1 | 5/2010 | Duke et al. |
| 2010/0132049 A1 | 5/2010 | Vernal et al. |
| 2010/0199098 A1 | 8/2010 | King |
| 2010/0228671 A1 | 9/2010 | Patterson |
| 2010/0274691 A1 | 10/2010 | Hammad et al. |
| 2010/0276484 A1 | 11/2010 | Banerjee et al. |
| 2010/0312700 A1 | 12/2010 | Coulter et al. |
| 2010/0327056 A1 | 12/2010 | Yoshikawa et al. |
| 2011/0023129 A1 | 1/2011 | Vernal et al. |
| 2011/0035288 A1 | 2/2011 | Clyne |
| 2011/0035318 A1 | 2/2011 | Hargrove et al. |
| 2011/0035596 A1 | 2/2011 | Attia et al. |
| 2011/0078010 A1 | 3/2011 | Postrel |
| 2011/0106698 A1 | 5/2011 | Isaacson et al. |
| 2011/0162057 A1 | 6/2011 | Gottumukkala et al. |
| 2011/0172837 A1 | 7/2011 | Forbes, Jr. |
| 2011/0176010 A1 | 7/2011 | Houjou et al. |
| 2011/0178929 A1 | 7/2011 | Durkin et al. |
| 2011/0191177 A1 | 8/2011 | Blackhurst et al. |
| 2011/0191239 A1 | 8/2011 | Blackhurst et al. |
| 2011/0196791 A1 | 8/2011 | Dominguez |
| 2011/0202462 A1 | 8/2011 | Keenan |
| 2011/0218849 A1 | 9/2011 | Rutigliano et al. |
| 2011/0247055 A1 | 10/2011 | Guo et al. |
| 2011/0276479 A1 | 11/2011 | Thomas |
| 2011/0307826 A1 | 12/2011 | Rivera et al. |
| 2011/0320246 A1 | 12/2011 | Tietzen et al. |
| 2012/0024946 A1 | 2/2012 | Tullis et al. |
| 2012/0030006 A1 | 2/2012 | Yoder et al. |
| 2012/0030109 A1 | 2/2012 | Dooley Maley et al. |
| 2012/0041881 A1 | 2/2012 | Basu et al. |
| 2012/0046994 A1 | 2/2012 | Reisman |
| 2012/0047072 A1 | 2/2012 | Larkin |
| 2012/0096534 A1 | 4/2012 | Boulos et al. |
| 2012/0099780 A1 | 4/2012 | Smith et al. |
| 2012/0101938 A1 | 4/2012 | Kasower |
| 2012/0117467 A1 | 5/2012 | Maloney et al. |
| 2012/0117476 A1 | 5/2012 | Siegrist et al. |
| 2012/0123841 A1 | 5/2012 | Taveau et al. |
| 2012/0123933 A1 | 5/2012 | Abel et al. |
| 2012/0124658 A1 | 5/2012 | Brudnicki et al. |
| 2012/0158590 A1 | 6/2012 | Salonen |
| 2012/0173387 A1 | 7/2012 | Talker et al. |
| 2012/0197691 A1 | 8/2012 | Grigg et al. |
| 2012/0214577 A1 | 8/2012 | Petersen et al. |
| 2012/0227094 A1 | 9/2012 | Begen et al. |
| 2012/0239417 A1 | 9/2012 | Pourfallah et al. |
| 2012/0239479 A1 | 9/2012 | Amaro et al. |
| 2012/0239670 A1 | 9/2012 | Horn et al. |
| 2012/0240235 A1 | 9/2012 | Moore |
| 2012/0246122 A1 | 9/2012 | Short et al. |
| 2012/0254038 A1 | 10/2012 | Mullen |
| 2012/0259782 A1 | 10/2012 | Hammad |
| 2012/0265682 A1 | 10/2012 | Menon |
| 2012/0265685 A1 | 10/2012 | Brudnicki et al. |
| 2012/0270522 A1 | 10/2012 | Laudermilch et al. |
| 2012/0296725 A1 | 11/2012 | Dessert et al. |
| 2012/0296831 A1 | 11/2012 | Carrott |
| 2012/0310760 A1 | 12/2012 | Phillips et al. |
| 2012/0317036 A1 | 12/2012 | Bower et al. |
| 2013/0006847 A1 | 1/2013 | Hammad et al. |
| 2013/0031006 A1 | 1/2013 | McCullagh et al. |
| 2013/0046607 A1 | 2/2013 | Granville, III |
| 2013/0046690 A1 | 2/2013 | Calman et al. |
| 2013/0055378 A1 | 2/2013 | Chang et al. |
| 2013/0080219 A1 | 3/2013 | Royyuru et al. |
| 2013/0090998 A1 | 4/2013 | Shimogori |
| 2013/0091452 A1 | 4/2013 | Sorden et al. |
| 2013/0103391 A1 | 4/2013 | Millmore et al. |
| 2013/0117696 A1 | 5/2013 | Robertson et al. |
| 2013/0132854 A1 | 5/2013 | Raleigh et al. |
| 2013/0151405 A1 | 6/2013 | Head et al. |
| 2013/0159178 A1 | 6/2013 | Colon et al. |
| 2013/0173402 A1 | 7/2013 | Young et al. |
| 2013/0174244 A1 | 7/2013 | Taveau et al. |
| 2013/0191213 A1 | 7/2013 | Beck et al. |
| 2013/0204894 A1 | 8/2013 | Faith |
| 2013/0212666 A1 | 8/2013 | Mattsson et al. |
| 2013/0218649 A1 | 8/2013 | Beal |
| 2013/0218758 A1 | 8/2013 | Koenigsbrueck et al. |
| 2013/0226813 A1 | 8/2013 | Voltz |
| 2013/0240618 A1 | 9/2013 | Hall |
| 2013/0246258 A1 | 9/2013 | Dessert |
| 2013/0246272 A1 | 9/2013 | Kirsch |
| 2013/0254079 A1 | 9/2013 | Murali |
| 2013/0254115 A1 | 9/2013 | Pasa et al. |
| 2013/0282542 A1 | 10/2013 | White |
| 2013/0301392 A1 | 11/2013 | Zhao |
| 2013/0317893 A1 | 11/2013 | Nelson et al. |
| 2013/0332256 A1 | 12/2013 | Faith et al. |
| 2013/0339124 A1 | 12/2013 | Postrel |
| 2013/0346302 A1 | 12/2013 | Purves et al. |
| 2013/0346306 A1 | 12/2013 | Kopp |
| 2013/0346310 A1 | 12/2013 | Burger et al. |
| 2014/0006209 A1 | 1/2014 | Groarke |
| 2014/0019352 A1 | 1/2014 | Shrivastava |
| 2014/0024354 A1 | 1/2014 | Haik et al. |
| 2014/0026193 A1 | 1/2014 | Saxman et al. |
| 2014/0032419 A1 | 1/2014 | Anderson et al. |
| 2014/0032723 A1 | 1/2014 | Nema |
| 2014/0040134 A1 | 2/2014 | Ciurea |
| 2014/0040144 A1 | 2/2014 | Plomske et al. |
| 2014/0046827 A1 | 2/2014 | Hochstatter et al. |
| 2014/0053069 A1 | 2/2014 | Yan |
| 2014/0058912 A1 | 2/2014 | Bajaj |
| 2014/0067503 A1 | 3/2014 | Ebarle Grecsek et al. |
| 2014/0067683 A1 | 3/2014 | Varadarajan |
| 2014/0068030 A1 | 3/2014 | Chambers et al. |
| 2014/0076967 A1 | 3/2014 | Pushkin et al. |
| 2014/0081736 A1 | 3/2014 | Blackhurst et al. |
| 2014/0108140 A1 | 4/2014 | Crawford |
| 2014/0108260 A1 | 4/2014 | Poole et al. |
| 2014/0108263 A1 | 4/2014 | Ortiz et al. |
| 2014/0114780 A1 | 4/2014 | Menefee et al. |
| 2014/0114855 A1 | 4/2014 | Bajaj et al. |
| 2014/0122328 A1 | 5/2014 | Grigg |
| 2014/0123312 A1 | 5/2014 | Marcotte |
| 2014/0129357 A1 | 5/2014 | Goodwin |
| 2014/0129448 A1 | 5/2014 | Aiglstorfer |
| 2014/0136419 A1 | 5/2014 | Kiyohara |
| 2014/0143886 A1 | 5/2014 | Eversoll et al. |
| 2014/0149198 A1 | 5/2014 | Kim et al. |
| 2014/0149293 A1 | 5/2014 | Laracey |
| 2014/0149368 A1 | 5/2014 | Lee et al. |
| 2014/0162598 A1 | 6/2014 | Villa-Real |
| 2014/0164220 A1 | 6/2014 | Desai et al. |
| 2014/0172576 A1 | 6/2014 | Spears et al. |
| 2014/0172707 A1 | 6/2014 | Kuntagod et al. |
| 2014/0180854 A1 | 6/2014 | Bryant, II |
| 2014/0198054 A1 | 7/2014 | Sharma et al. |
| 2014/0200957 A1 | 7/2014 | Biggs |
| 2014/0207672 A1 | 7/2014 | Kelley |

(56) References Cited

U.S. PATENT DOCUMENTS

| | | |
|---|---|---|
| 2014/0236792 A1 | 8/2014 | Pant et al. |
| 2014/0237236 A1 | 8/2014 | Kalinichenko et al. |
| 2014/0248852 A1 | 9/2014 | Raleigh et al. |
| 2014/0250002 A1 | 9/2014 | Isaacson et al. |
| 2014/0258104 A1 | 9/2014 | Harnisch |
| 2014/0258109 A1 | 9/2014 | Jiang et al. |
| 2014/0258110 A1 | 9/2014 | Davis et al. |
| 2014/0279309 A1 | 9/2014 | Cowen et al. |
| 2014/0279474 A1 | 9/2014 | Evans et al. |
| 2014/0279551 A1 | 9/2014 | Samid |
| 2014/0279559 A1 | 9/2014 | Smith et al. |
| 2014/0282852 A1 | 9/2014 | Vestevich |
| 2014/0297438 A1 | 10/2014 | Dua |
| 2014/0306833 A1 | 10/2014 | Ricci |
| 2014/0324527 A1 | 10/2014 | Kulkarni et al. |
| 2014/0337188 A1 | 11/2014 | Bennett et al. |
| 2014/0337215 A1 | 11/2014 | Howe |
| 2014/0344149 A1 | 11/2014 | Campos |
| 2014/0344153 A1 | 11/2014 | Raj et al. |
| 2014/0344877 A1 | 11/2014 | Ohmata et al. |
| 2014/0357233 A1 | 12/2014 | Maximo et al. |
| 2014/0365291 A1 | 12/2014 | Shvarts |
| 2014/0372308 A1 | 12/2014 | Sheets |
| 2014/0379575 A1 | 12/2014 | Rogan |
| 2015/0019443 A1 | 1/2015 | Sheets et al. |
| 2015/0019944 A1 | 1/2015 | Kalgi |
| 2015/0026026 A1 | 1/2015 | Calman et al. |
| 2015/0026049 A1 | 1/2015 | Theurer et al. |
| 2015/0026057 A1 | 1/2015 | Calman et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0039457 A1 | 2/2015 | Jacobs et al. |
| 2015/0039496 A1 | 2/2015 | Shuster |
| 2015/0046338 A1 | 2/2015 | Laxminarayanan et al. |
| 2015/0046339 A1 | 2/2015 | Wong et al. |
| 2015/0066768 A1 | 3/2015 | Williamson et al. |
| 2015/0070132 A1 | 3/2015 | Candelore |
| 2015/0073989 A1 | 3/2015 | Green et al. |
| 2015/0079932 A1 | 3/2015 | Zelinka et al. |
| 2015/0081349 A1 | 3/2015 | Johndrow et al. |
| 2015/0082042 A1 | 3/2015 | Hoornaert et al. |
| 2015/0088633 A1 | 3/2015 | Salmon et al. |
| 2015/0088756 A1 | 3/2015 | Makhotin et al. |
| 2015/0095238 A1 | 4/2015 | Khan et al. |
| 2015/0095999 A1 | 4/2015 | Toth |
| 2015/0096039 A1 | 4/2015 | Mattsson et al. |
| 2015/0100477 A1 | 4/2015 | Salama et al. |
| 2015/0100495 A1 | 4/2015 | Salama et al. |
| 2015/0106239 A1 | 4/2015 | Gaddam et al. |
| 2015/0112870 A1 | 4/2015 | Nagasundaram et al. |
| 2015/0121500 A1 | 4/2015 | Venkatanaranappa et al. |
| 2015/0127524 A1 | 5/2015 | Jacobs et al. |
| 2015/0127547 A1 | 5/2015 | Powell et al. |
| 2015/0128215 A1 | 5/2015 | Son et al. |
| 2015/0132984 A1 | 5/2015 | Kim et al. |
| 2015/0134700 A1 | 5/2015 | MacKlem et al. |
| 2015/0142673 A1 | 5/2015 | Nelsen et al. |
| 2015/0149272 A1 | 5/2015 | Salmon et al. |
| 2015/0149357 A1 | 5/2015 | Ioannidis et al. |
| 2015/0154595 A1 | 6/2015 | Collinge et al. |
| 2015/0178724 A1 | 6/2015 | Ngo et al. |
| 2015/0180836 A1 | 6/2015 | Wong et al. |
| 2015/0186856 A1 | 7/2015 | Weiss et al. |
| 2015/0193639 A1 | 7/2015 | Esposito et al. |
| 2015/0193764 A1 | 7/2015 | Haggerty et al. |
| 2015/0193866 A1 | 7/2015 | Van Heerden et al. |
| 2015/0199679 A1 | 7/2015 | Palanisamy et al. |
| 2015/0199689 A1 | 7/2015 | Kumnick et al. |
| 2015/0200495 A1 | 7/2015 | Yu et al. |
| 2015/0213435 A1 | 7/2015 | Douglas et al. |
| 2015/0220999 A1 | 8/2015 | Thornton et al. |
| 2015/0221149 A1 | 8/2015 | Main et al. |
| 2015/0229622 A1 | 8/2015 | Grigg et al. |
| 2015/0242853 A1 | 8/2015 | Powell |
| 2015/0248405 A1 | 9/2015 | Rudich et al. |
| 2015/0254635 A1 | 9/2015 | Bondesen et al. |
| 2015/0254638 A1 | 9/2015 | Bondesen et al. |
| 2015/0254646 A1 | 9/2015 | Harkey et al. |
| 2015/0254647 A1 | 9/2015 | Bondesen et al. |
| 2015/0254655 A1 | 9/2015 | Bondesen et al. |
| 2015/0254656 A1 | 9/2015 | Bondesen et al. |
| 2015/0269566 A1 | 9/2015 | Gaddam et al. |
| 2015/0277712 A1 | 10/2015 | Ratcliffe et al. |
| 2015/0286834 A1 | 10/2015 | Ohtani et al. |
| 2015/0287133 A1 | 10/2015 | Marlov et al. |
| 2015/0295906 A1 | 10/2015 | Ufford et al. |
| 2015/0312038 A1 | 10/2015 | Palanisamy |
| 2015/0319158 A1 | 11/2015 | Kumnick |
| 2015/0319198 A1 | 11/2015 | Gupta et al. |
| 2015/0324592 A1 | 11/2015 | Dutta |
| 2015/0332067 A1 | 11/2015 | Gorod |
| 2015/0339663 A1 | 11/2015 | Lopreiato et al. |
| 2015/0339664 A1 | 11/2015 | Wong et al. |
| 2015/0348083 A1 | 12/2015 | Brill et al. |
| 2015/0371221 A1 | 12/2015 | Wardman |
| 2015/0372999 A1 | 12/2015 | Pi-Sunyer |
| 2015/0379508 A1 | 12/2015 | Van |
| 2016/0004741 A1 | 1/2016 | Johnson et al. |
| 2016/0026997 A1 | 1/2016 | Tsui et al. |
| 2016/0028550 A1 | 1/2016 | Gaddam et al. |
| 2016/0028735 A1 | 1/2016 | Francis et al. |
| 2016/0036790 A1 | 2/2016 | Shastry et al. |
| 2016/0042381 A1 | 2/2016 | Braine et al. |
| 2016/0063497 A1 | 3/2016 | Grant, IV |
| 2016/0065370 A1 | 3/2016 | Le Saint et al. |
| 2016/0078428 A1 | 3/2016 | Moser et al. |
| 2016/0080403 A1 | 3/2016 | Cunningham et al. |
| 2016/0086222 A1 | 3/2016 | Kurapati |
| 2016/0092696 A1 | 3/2016 | Guglani et al. |
| 2016/0092870 A1 | 3/2016 | Salama et al. |
| 2016/0092872 A1 | 3/2016 | Prakash et al. |
| 2016/0092874 A1 | 3/2016 | O'Regan et al. |
| 2016/0098577 A1 | 4/2016 | Lacey et al. |
| 2016/0098692 A1 | 4/2016 | Johnson et al. |
| 2016/0109954 A1 | 4/2016 | Harris et al. |
| 2016/0119296 A1 | 4/2016 | Laxminarayanan et al. |
| 2016/0125405 A1 | 5/2016 | Alterman et al. |
| 2016/0125409 A1 | 5/2016 | Meredith et al. |
| 2016/0127892 A1 | 5/2016 | Huang et al. |
| 2016/0132918 A1 | 5/2016 | Thomas |
| 2016/0140221 A1 | 5/2016 | Park et al. |
| 2016/0140541 A1 | 5/2016 | Pearson et al. |
| 2016/0149875 A1 | 5/2016 | Li et al. |
| 2016/0155156 A1 | 6/2016 | Gopal et al. |
| 2016/0171483 A1 | 6/2016 | Luoma et al. |
| 2016/0173483 A1 | 6/2016 | Wong et al. |
| 2016/0180302 A1 | 6/2016 | Bagot, Jr. |
| 2016/0189121 A1 | 6/2016 | Best et al. |
| 2016/0217461 A1 | 7/2016 | Gaddam et al. |
| 2016/0232600 A1 | 8/2016 | Purves |
| 2016/0239437 A1 | 8/2016 | Le et al. |
| 2016/0239835 A1 | 8/2016 | Marsyla |
| 2016/0239840 A1 | 8/2016 | Preibisch |
| 2016/0260084 A1 | 9/2016 | Main et al. |
| 2016/0260176 A1 | 9/2016 | Bernard et al. |
| 2016/0267467 A1 | 9/2016 | Rutherford et al. |
| 2016/0267480 A1 | 9/2016 | Metral |
| 2016/0292673 A1 | 10/2016 | Chandrasekaran |
| 2016/0294879 A1 | 10/2016 | Kirsch |
| 2016/0307229 A1 | 10/2016 | Balasubramanian et al. |
| 2016/0314458 A1 | 10/2016 | Douglas et al. |
| 2016/0321669 A1 | 11/2016 | Beck et al. |
| 2016/0328522 A1 | 11/2016 | Howley |
| 2016/0328577 A1 | 11/2016 | Howley |
| 2016/0358163 A1 | 12/2016 | Kumar et al. |
| 2016/0371471 A1 | 12/2016 | Patton et al. |
| 2016/0373458 A1 | 12/2016 | Moreton et al. |
| 2016/0379211 A1 | 12/2016 | Hoyos et al. |
| 2017/0004506 A1 | 1/2017 | Steinman et al. |
| 2017/0004590 A1 | 1/2017 | Gluhovsky |
| 2017/0011215 A1 | 1/2017 | Poiesz et al. |
| 2017/0011389 A1 | 1/2017 | McCandless et al. |
| 2017/0011450 A1 | 1/2017 | Frager et al. |

(56) References Cited

U.S. PATENT DOCUMENTS

| | | |
|---|---|---|
| 2017/0018029 A1 | 1/2017 | Eiriz et al. |
| 2017/0024393 A1 | 1/2017 | Choksi et al. |
| 2017/0068954 A1 | 3/2017 | Hockey et al. |
| 2017/0070484 A1 | 3/2017 | Kruse et al. |
| 2017/0078299 A1 | 3/2017 | Castinado et al. |
| 2017/0078303 A1 | 3/2017 | Wu |
| 2017/0091759 A1 | 3/2017 | Selfridge et al. |
| 2017/0132633 A1 | 5/2017 | Whitehouse |
| 2017/0147631 A1 | 5/2017 | Nair et al. |
| 2017/0161724 A1 | 6/2017 | Lau |
| 2017/0161973 A1 | 6/2017 | Katta et al. |
| 2017/0237554 A1 | 8/2017 | Jacobs et al. |
| 2017/0249478 A1 | 8/2017 | Lovin |
| 2017/0344991 A1 | 11/2017 | Mark et al. |
| 2017/0352028 A1 | 12/2017 | Vridhachalam et al. |
| 2017/0364898 A1 | 12/2017 | Ach et al. |
| 2017/0366348 A1 | 12/2017 | Weimer |
| 2018/0005323 A1 | 1/2018 | Grassadonia |
| 2018/0006821 A1 | 1/2018 | Kinagi |
| 2018/0025145 A1 | 1/2018 | Morgner et al. |
| 2018/0053200 A1 | 2/2018 | Cronin et al. |
| 2018/0075440 A1 | 3/2018 | Beck et al. |
| 2018/0088909 A1 | 3/2018 | Baratta et al. |
| 2018/0096752 A1 | 4/2018 | Ovalle |
| 2018/0121913 A1 | 5/2018 | Unnerstall et al. |
| 2018/0158137 A1 | 6/2018 | Tsantes et al. |
| 2018/0174148 A1 | 6/2018 | Selvarajan |
| 2018/0247302 A1 | 8/2018 | Armstrong et al. |
| 2018/0254898 A1 | 9/2018 | Sprague et al. |
| 2018/0268382 A1 | 9/2018 | Wasserman |
| 2018/0270363 A1 | 9/2018 | Guday et al. |
| 2018/0276628 A1 | 9/2018 | Radiotis et al. |
| 2018/0293554 A1 | 10/2018 | Johnson |
| 2018/0331835 A1 | 11/2018 | Jackson |
| 2018/0349922 A1 | 12/2018 | Carlson et al. |
| 2018/0357440 A1 | 12/2018 | Brady et al. |
| 2018/0373891 A1 | 12/2018 | Barday et al. |
| 2019/0007381 A1 | 1/2019 | Isaacson et al. |
| 2019/0095898 A1 | 3/2019 | Bhatia |
| 2019/0164221 A1 | 5/2019 | Hill et al. |
| 2019/0171831 A1 | 6/2019 | Xin |
| 2019/0197501 A1 | 6/2019 | Senci et al. |
| 2019/0220834 A1 | 7/2019 | Moshal et al. |
| 2019/0228173 A1 | 7/2019 | Gupta et al. |
| 2019/0228428 A1 | 7/2019 | Bruner et al. |
| 2019/0228430 A1 | 7/2019 | Givol et al. |
| 2019/0244214 A1 | 8/2019 | Flores et al. |
| 2019/0295069 A1 | 9/2019 | Pala et al. |
| 2019/0318122 A1 | 10/2019 | Hockey et al. |
| 2019/0318424 A1 | 10/2019 | McWilliams |
| 2019/0325161 A1 | 10/2019 | Zavesky et al. |
| 2019/0332802 A1 | 10/2019 | Barday et al. |
| 2019/0333061 A1 | 10/2019 | Jackson et al. |
| 2019/0347442 A1 | 11/2019 | Marlin et al. |
| 2019/0354979 A1 | 11/2019 | Crawford |
| 2019/0356641 A1 | 11/2019 | Isaacson et al. |
| 2019/0362069 A1 | 11/2019 | Park et al. |
| 2019/0369845 A1 | 12/2019 | Rucker |
| 2019/0370798 A1 | 12/2019 | Hu et al. |
| 2019/0378182 A1 | 12/2019 | Weinflash et al. |
| 2019/0392443 A1 | 12/2019 | Piparsaniya et al. |
| 2020/0005283 A1 | 1/2020 | Zimmerman et al. |
| 2020/0005347 A1 | 1/2020 | Boal |
| 2020/0074552 A1 | 3/2020 | Shier et al. |
| 2020/0076601 A1 | 3/2020 | Jafari |
| 2020/0090179 A1 | 3/2020 | Song et al. |
| 2020/0118114 A1 | 4/2020 | Benkreira et al. |
| 2020/0118132 A1 | 4/2020 | Schmidt et al. |
| 2020/0118133 A1 | 4/2020 | Schmidt et al. |
| 2020/0286057 A1 | 9/2020 | Desai |
| 2020/0286076 A1 | 9/2020 | Zhu et al. |
| 2020/0380514 A1 | 12/2020 | Crofts |
| 2021/0012326 A1 | 1/2021 | Maxwell Zelocchi |
| 2021/0027300 A1 | 1/2021 | Chetia et al. |
| 2021/0035072 A1 | 2/2021 | Awasthi |
| 2021/0124760 A1 | 4/2021 | Klein et al. |
| 2021/0217002 A1 | 7/2021 | Basu et al. |
| 2021/0233170 A1 | 7/2021 | Cadet |
| 2021/0258169 A1 | 8/2021 | Basu et al. |
| 2021/0303335 A1 | 9/2021 | Foreman et al. |
| 2021/0350343 A1 | 11/2021 | Gaur et al. |
| 2021/0350458 A1 | 11/2021 | Gaur et al. |
| 2022/0029815 A1 | 1/2022 | Basu et al. |
| 2022/0292496 A1 | 9/2022 | Yan |
| 2022/0294630 A1 | 9/2022 | Collen |
| 2023/0036439 A1 | 2/2023 | Olson et al. |
| 2023/0070625 A1 | 3/2023 | Gaur et al. |
| 2023/0206329 A1 | 6/2023 | Cella et al. |
| 2023/0214925 A1 | 7/2023 | Cella et al. |
| 2024/0265405 A1 | 8/2024 | Kramme et al. |

FOREIGN PATENT DOCUMENTS

| | | | |
|---|---|---|---|
| CA | 2369296 A1 | 10/2000 | |
| CA | 2751554 A1 | 8/2010 | |
| CN | 1353842 A | 6/2002 | |
| CN | 101303717 A | 11/2008 | |
| CN | 102498497 A | 6/2012 | |
| CN | 102804219 A | 11/2012 | |
| CN | 103635920 A | 3/2014 | |
| CN | 104106276 B | 10/2014 | |
| CN | 102648476 B | 3/2016 | |
| CN | 103413231 B | 10/2017 | |
| CN | 107230049 A | 10/2017 | |
| CN | 107230070 A | 10/2017 | |
| EP | 1259947 A2 * | 11/2002 | ............. G06Q 20/10 |
| EP | 1 770 628 A2 | 4/2007 | |
| EP | 3 073 670 B1 | 9/2016 | |
| GB | 441156 * | 2/2008 | ........... G06Q 20/354 |
| GB | 2441156 A * | 2/2008 | ........... G06Q 20/354 |
| KR | 20160015375 A | 2/2016 | |
| WO | WO-90/13096 A1 | 11/1990 | |
| WO | WO-00/72245 A1 | 11/2000 | |
| WO | WO-03/038551 A2 | 5/2003 | |
| WO | WO-2004/081893 A1 | 9/2004 | |
| WO | WO-2004090825 A1 * | 10/2004 | ............. G06Q 20/32 |
| WO | WO-2009/151839 A1 | 12/2009 | |
| WO | WO-2011/017613 A2 | 2/2011 | |
| WO | WO-2011/053404 A1 | 5/2011 | |
| WO | WO-2012/054148 A1 | 4/2012 | |
| WO | WO-2012/150602 A1 | 11/2012 | |
| WO | WO-2013/075071 A1 | 5/2013 | |
| WO | WO-2013/082190 A1 | 6/2013 | |
| WO | WO-2015/103443 A1 | 7/2015 | |
| WO | WO-2015/135131 A1 | 9/2015 | |
| WO | WO-2016/015054 A1 | 1/2016 | |
| WO | WO-2016/025291 A1 | 2/2016 | |
| WO | WO-2017/035399 A1 | 3/2017 | |
| WO | WO-2018/005635 A1 | 1/2018 | |
| WO | WO-2022/154789 A1 | 7/2022 | |

OTHER PUBLICATIONS

ASB, "How to command your cards with ASB Card Control" Apr. 20, 2015, https://www.youtube.com/watch?v=O1sfxvVUL74 (Year: 2015).

Austin Telco Federal Credit Union, "Lost or Stolen Cards", www.atfcu.org/lost-stolen-cards.htm; Apr. 9, 2004. 6 pages.

Authorize.Net. Authorize.Net Mobile Application: iOS User Guide. Sep. 2015. Authorize.Net LLC. Ver.2.0, 1-23. https://www.authorize.net/content/dam/anet-redesign/documents/iosuserguide.pdf (Year: 2015).

BancFirst, "Lost Card", https://www.bancfirst.com/contact.aspx, Oct. 28, 2003. 1 page.

CM/ECF, "CM/ECF Internet Credit Card Payment Guide", https://www.vaeb.uscourts.gov/wordpress/?page_id=340, Mar. 16, 2005. 12 pages.

Co-Op Think, Rachna Ahlawat at Co-Op Think—Evolution Sessions from Think14, Dec. 22, 2014, 26:22. https://www.youtube.com/watch?v=yEp-qfZoPhl (Year: 2014).

Cronian, Darrin "Credit card companies Freeze Spending whilst Abroad", published Jun. 9, 2007, Available at: http://www.travel-

(56) References Cited

OTHER PUBLICATIONS rants.com/2007/06/09/credit-card-companies-freeze-spending-whilst-abroad/.
Demiriz et al. "Using Location Aware Business Rules for Preventing Retail Banking Frauds" Jan. 15, 2015, IEEE (Year: 2015).
Diversinet enables new consumer mobile services from intersections inc.; MobiSecure wallet and vault helps identity management leader get closer to its customers. (May 30, 2007). PR Newswire Retrieved from https://dialog.proquest.com/professional/docview/450976918?accountid=131444 on Feb. 22, 2023 (Year: 2007).
Eickhoff et al: "Quality through Flow and Immersion: Gamifying Crowdsourced Relevance Assessments",Proceedings of the 35th international ACM SIGIR conference on Research and development in information retrieval, Aug. 12, 2012. (Year: 2012).
Fiserv. CardValet: Mobile Application Training. Fiserv, Inc. 1-93. https://www.westernbanks.com/media/1664/ cardvalet-application .pdf (Year: 2015).
Fort Knox Federal Credit Union, "Lost or Stolen Visa Card", http://www.fortknoxfcu.org/loststolen.html, Feb. 1, 2001. 2 pages.
IEEE Xplore; 2009 First Asian Himalayas International Conference on Internet: Emergence of Payment Systems in the age of Electronic Commerce.; The state off Art. Author S Singh Nov. 1, 2009 pp. 1-18 (Year: 2009).
IP.com Search Query; May 5, 2020 (Year: 2020).
Konsko: "Credit Card Tokenization: Here's What You Need to Know", Credit Card Basics, Credit Card—Advertisement Nerdwallet (Year: 2014).
Merrick Bank, "Reporting Lost or Stolen Card Help Return to the Cardholder Center FAQs", http://www.merrickbank.com/Frequent-Asked-Questions/Report-Stolen-Card.aspx, Aug. 9, 2004. 1 page.
Microsoft, "Automatically summarize a document", 2016. 3 pages.
Notre Dame FCU "Irish Card Shield: How to Control Transaction Types" Jan. 15, 2016, 0:27, https://youtube.com/watch?v=0eZG1c6Bn38 (Year: 2016).
PCM Credit Union, "CardValet Tutorial" Jun. 24, 2015, https://www.youtube.com/watch?v=uGPh9Htw0Wc (Year: 2015).
Purchasing charges ahead. (1994). Electronic Buyers' News,, 68. Retrieved from https://dialog.proquest.com/professional/docview/681599288?accountid=131444 on Nov. 13, 2020 (Year: 1994).
RBC Royal Bank, "If Your Card is Lost or Stolen", http://www.rblbank.com/pdfs/CreditCard/FAQs.pdf, Oct. 1, 2002. 2 pages.
Smartphones as Practical and Secure Location Verification Tokens for Payments. (Year: 2014).
State Employees Credit Union, "Lost or Stolen Account Info", https://www.secumd.org/advice-planning/money-and-credit/privacy-fraud-protection/lost-or-stolen-account-info.aspx, May 20, 2005. 2 pages.
Transaction aggregation as a strategy for credit card fraud detection. (Year: 2009).
Union Bank & Trust, "Report Lost or Stolen Card", http://www.ubt.com/security-fraud/report-lost-or-stolen-cards, Jul. 10, 2005. 13 pages.
Urein et al: "A breakthrough for prepaid payment: End to end token exchange and management using secure SSL channels created by EAP-TLS smart cards", 2011 International Conference on Collaboration Technologies and Systems (CTS) (Year: 2011).
Using location aware business rules for preventing retail banking frauds. https://ieeexplore.ieee.org/stamp/stamp.jsp?tp=&arnumber=7351936 (Year: 2015).
Yang MH. Security enhanced EMV-based mobile payment protocol. Scientific World Journal. 2014.https://www.ncbi.nlm.nih.gov/ pmc/articles/PMC4181509/ (Year: 2014).
Hinze et al.; Event-Based Applications and Enabling Technologies. https://www.researchgate.net/profile/Annika-Hinze/publication/220796268_Event-based_applications_and_enabling_technologies/Links/0fcfd 50b638d9592a1000000/Event-based-applications-and-enabling-technologies.pdf (Year: 2009).
Technologies for Payment Fraud Prevention: EMV, Encryption, and Tokenization, Oct. 2014, Smart Card Alliance, pp. 1-34 (Year: 2014).
Yang, Ming-Hour; Security Enhanced EMV-Based Mobile Payment Protocol. https://patents.google.com/scholar/ 15767854982483958498?q (Security Enhanced EMV-Based Mobile Payment Protocol)&patents=false&scholar&oq=Security Enhanced EMV-Based Mobile Payment Protocol (Year: 2014).
Luz et al: "A Mobile NFC Payment Terminal for the Event-Wallet on an Android Smartphone" researchgat.net, (Year: 2012).
"Bitcoin Off-Chain Transactions: Their Invention and Use," by Michelle Mount. Geo. L. Tech. Rev. 4. 2020. pp. 685-698. (Year: 2020).
"The Bitcoin Lightening Network: Scalable Off-Chain Instant Payments," by Joseph Poon; and Thaddeus Dryia. Jan. 14, 2016. (Year: 2016).
NPL Search Terms (Year: 2024).
Shiravale, et al., Blockchain Technology: A Novel Approach in Information Security Research, IEEE 2018 (Year: 2018), 4 pps.
Yang, et al., Impact of Bitcoin's Distributed Structure on the Construction of the Central Bank's Digital Currency System IEEE, 2020 (Year: 2020), 4 pps.
Tene et al. Big Data for All: Privacy and User Control in the Age of Analytics. Northwestern Journal of technology and Intellectual Property. https://scholarlycommons.law.northwestern.edu/cgi/viewcontent.cgi?article= 1191 &context=njtip (Year: 2013).
Demiriz et al., "Using location aware business rules for preventing retail banking frauds," 2015 First International Conference on Anti-Cybercrime (ICACC), pp. 1-6. https://ieeexplore.IEEE.org/documenU7351936? source=IQplus.
Dunman et al., "A Novel and Successful Credit Card Fraud Detection System Implemented in a Turkish Bank," 2013 IEEE 13th International Conference on Data Mining Workshops, Dallas, Tx, USA. Retrieved from https://ieeexplore.IEEE.org/documenU6753916? source=IQplus.
Ivatury, G., Mobile Phone Banking and Low-Income Customers, 2006, Retrieved from https://www.cgap.org/sites/default/files/CGAP-Mobile-Phone-Banking-and-Low-Income-Customers- Evidence-from-South-Africa-Jan. 2006.pdf.
Park et al., "Leveraging Cellular Infrastructure to Improve Fraud Prevention," 2009 Annual Computer Security Applications Conference, Honolulu, HI, USA, https://ieeexplore.IEEE.org/documenU5380689?source= IQplus.
Trappey et al., "Patent portfolio analysis of e-payment services using technical ontology roadmaps," 2016 IEEE International Conference on Systems, Man, and Cybernetics (SMC), Budapest, Hungary. Retrieved from https://ieeexplore.IEEE.org/documenU7844992?source=IQplus.

* cited by examiner

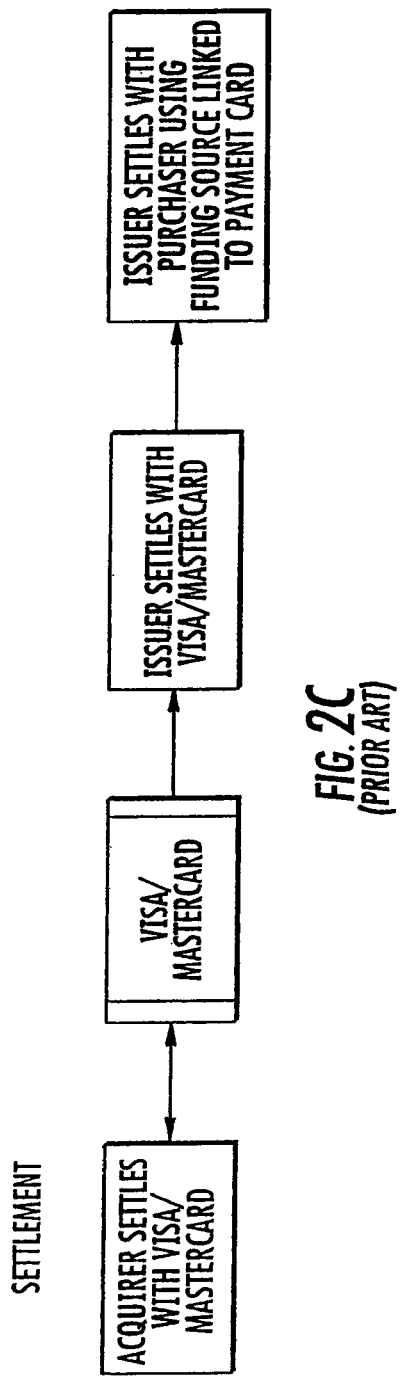

PAYMENT VEHICLE WITH ON AND OFF FUNCTION

CROSS-REFERENCE TO RELATED APPLICATIONS

This application is a continuation of U.S. patent application Ser. No. 17/397,532, filed Aug. 9, 2021, which is a continuation of U.S. patent application Ser. No. 16/719,419, filed Dec. 18, 2019, now U.S. Pat. No. 11,100,495 issued Aug. 24, 2021, which is a continuation of U.S. patent application Ser. No. 13/829,640, filed Mar. 14, 2013, now U.S. Pat. No. 10,867,298 issued Dec. 15, 2020, which is a continuation-in-part application which claims priority from U.S. patent application Ser. No. 12/316,996, filed Dec. 18, 2008, which claims priority from U.S. Provisional Application Ser. No. 61/197,872, filed on Oct. 31, 2008, the disclosures of which are incorporated herein by reference in their entireties.

FIELD OF THE INVENTION

The present invention relates to a computer system and computer-implemented method for use with a payment vehicle to provide a payment vehicle holder with the ability to turn on and off (i.e. enable and disable) its payment vehicle for use in electronic payment transactions.

BACKGROUND OF THE INVENTION

In today's payment environment, there are a very few number of payment transactions or other financial transactions that occur with cash. Most purchases occur with forms of payment other than cash using various payment instruments such as credit cards, debit cards, among others. Furthermore, there are an increasing number of payment transactions that occur electronically or via a web interface such as over the internet or worldwide web. With an increasing volume of transactions conducted with payment instruments other than cash and often not by the purchaser in person at point of sale, there is an increased likelihood of fraudulent transactions and lack of personal control over the payment transaction.

Additionally, in today's payment environment, a payment instrument is always turned "on" leading to abuse and fraud. Currently, a payment vehicle can be blocked if a credit or debit card, for example, is lost or stolen by calling a customer service representative of the card issuer after occurrence of the fraudulent event and requesting that the card be canceled or blocked after the occurrence. There are numerous disadvantages associated with such a process. For example, there may be a delay before a payment instrument holder even recognizes that a fraudulent event occurred or is occurring using the payment holder's payment instrument. There is also a real-time delay between when a payment instrument holder recognizes that there has been fraud or abuse associated with its payment instrument and when the customer service representative is able to cancel or block the account. Fraudulent use of a card can even occur while the customer service representative is canceling or blocking the account associated with the payment vehicle. Thus, a payment holder does not have direct control and is limited by currently existing processes. Likewise, a payment instrument holder who desires to make changes to its account does not have direct control to do so and also customarily relies upon a customer service representative.

With respect to misuse or fraudulent use of a payment instrument, there are ways in today's existing payment systems to minimize fraud and abuse of the payment vehicle; however, they require assistance outside of the control of the payment vehicle holder. For example, a credit or debit card account can be closed, a temporary block can be placed on the card, or a country level block can be placed (for example, do not accept any charges being made in a specified country). Unfortunately, such controls are implemented after occurrence of the event.

Thus, there is a need to minimize the current risk to a holder of a payment instrument. There is also a need to find a way to shift control of the payment instrument to the payment instrument holder as well as to mitigate abuse and fraud associated with unauthorized use of a payment vehicle and the delays associated with mitigating such loss. There is also a need to have greater control in the payment process.

As indicated above, most payment transactions today involve the transfer of electronic funds. For purposes of background, the current industry practice with respect to electronic funds payment using a payment instrument is best shown by referring now to FIG. 1 which is a flow diagram illustrating a known process for purchaser payment. According to FIG. 1, a purchaser typically carries multiple forms of payment to allow the purchaser to choose which source of funding to use to pay for a given purchase. As is the current practice in the industry, a line of communication must be made between each form of payment used by a purchaser and each source of funds via an existing computer payment network or system. This occurs for each transaction. Thus, each transaction may require a different form of payment, a different point of sale (POS) terminal, a different computer payment system, a different source of funds, or a combination thereof. Thus, for multiple transactions, there are numerous communications and many transaction processing steps that must occur.

FIG. 2A is a flow diagram which expands upon the existing computer payment system infrastructure of FIG. 1 and is an example of a credit or debit route for a VISA or MasterCard transaction. The parties to an authorization and a settlement VISA or MasterCard transaction typically comprise a purchaser, a merchant, an optional International Sales Organization (ISO), a merchant acquirer, VISA/MasterCard, an optional issuer processor, an issuer, and a source of funds. A series of events shown in FIG. 2A has to occur for each VISA/MasterCard transaction using a VISA/MasterCard payment card used at a merchant point of sale (POS) terminal. Among the disadvantages associated with such a system is that it requires purchasers to carry multiple payment instruments that are always "on," increases the risk that a payment instrument such as a credit card or a debit card will get lost or stolen which in turn increases the risk of fraud, and does not provide the payment instrument holder the ability to control the terms and conditions of the use of the payment instrument at point of sale.

FIG. 2B is a flow diagram illustrating the current industry process for authorization of a VISA/MasterCard transaction. FIG. 2C is a flow diagram illustrating the current industry process for settlement of a VISA/MasterCard transaction. In the authorization process, as shown in FIG. 2B, a purchaser uses a VISA/MasterCard payment card to pay for goods or services at a merchant point of sale (POS) terminal, the transaction is captured by an ISO or a merchant acquirer. An ISO is an independent sales organization that is a reseller of acquirer services. A merchant acquirer is typically a bank member of a card network that collects payments on behalf of a merchant. The transaction is then routed by the merchant acquirer to the computer payment network which, in this example, is VISA or MasterCard. The transaction is then routed to an issuer. The issuer is typically a bank member of a card network that issues network approved cards. The issuer may approve or deny a transaction based upon the presence of fraudulent activity or upon funds availability. The funds availability is communicatively connected to a source of funds as shown in FIG. 2A. The transaction is either approved or declined and returned to the merchant POS terminal.

With respect to the process for settlement shown in FIG. 2C, VISA/MasterCard facilitates settlement between the merchant acquirer and issuer. The merchant acquirer then settles with the merchant. The issuer then settles with the purchaser using the funding source that is linked to the VISA MasterCard payment card.

The above process is known and currently occurs for each such payment transaction. As indicated above, there is no means for a payment holder to have direct control over the payment instrument's availability for use because it is always "on." There is no means to address fraudulent use until after the occurrence of the fraud or misuse. Thus, there remains a need for an alternative payment instrument that addresses these enumerated concerns as well as others of the payment instrument holder.

SUMMARY OF THE INVENTION

The present invention is directed to a computer system and a computer-implemented method for use with a payment vehicle to provide a payment vehicle holder with the ability to turn on and off (i.e. enable and disable) its payment vehicle for use in electronic payment transactions in an automated process and without human intervention by a bank, card issuer, or other institution.

In accordance with an aspect of the present invention, the computer system comprises a computer having memory and a processor for processing input data received from a remote device. The input data comprises an instruction executable by the processor in a form of a text message or electronic mail received from the remote device, with the instruction to enable a payment card of a payment card holder by changing the payment card from a disabled status to an enabled status.

In accordance with an aspect of the present invention, the computer system comprises a computer having memory and a processor for processing input data received from a remote device. The input data comprises an instruction executable by the processor in a form of a text message or electronic mail received from the remote device, with the instruction to disable a payment card of a payment card holder by changing the payment card from an enabled status to a disabled status.

In accordance with another aspect of the present invention, a computer system comprises a computer having memory and a processor for processing input data received from a remote device. The input data comprises an instruction executable by the processor in a form of a text message or electronic mail received from the remote device, with the instruction to check a status of a payment card of a payment card holder.

In accordance with another aspect of the present invention, a computer system comprises a processor and memory wherein the memory comprises instructions executable by the processor. The instructions comprise instructions for a first module for enabling a payment card of a payment card holder, wherein the first instructions are received from a remote device in a form of a text message or electronic mail.

In accordance with yet another aspect of the present invention, a computer system comprises a processor and memory wherein the memory comprising instructions executable by the processor. The instructions comprise first instructions for a first module for disabling a payment card of a payment card holder, wherein the first instructions are received from a remote device in a form of a text message.

In accordance with still yet another aspect of the present invention, a computer-implemented method is provided. The method comprises receiving by a computer system a text message or electronic mail with instructions to enable or disable a payment card, the instructions being sent from a remote device to a computer of the computer system having memory and a processor for processing the text message or electronic mail as input data, processing the input data by the processor, and enabling or disabling the payment card.

There are also numerous features and functions associated with the computer system and computer-implemented method of the present invention. Many of which are described in detail herein. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein:

FIG. 2C is a flow diagram of the current industry process for settlement of a VISA/MasterCard transaction.

DETAILED DESCRIPTION OF THE INVENTION

Figure 1:
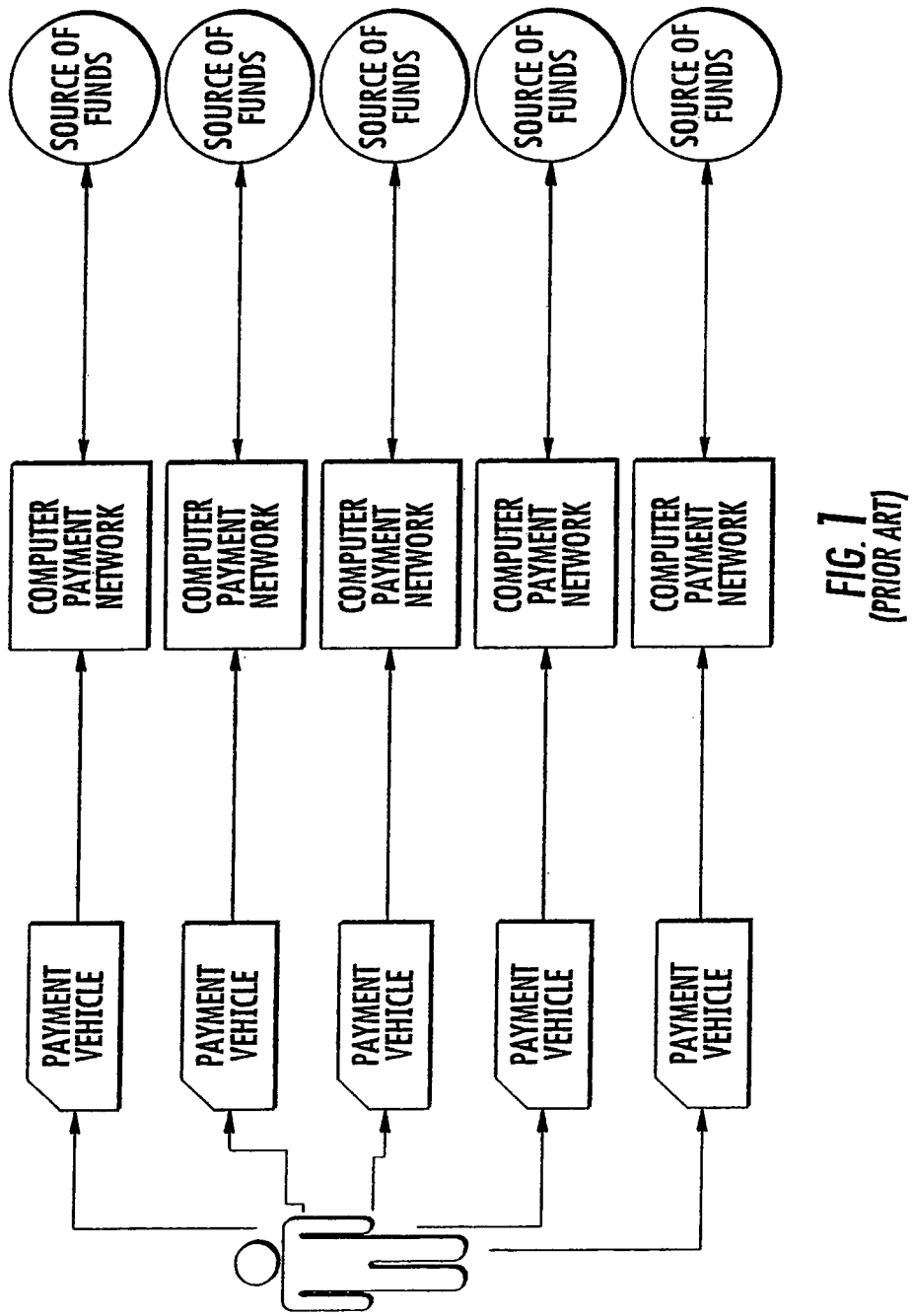
FIG. 1 is a flow diagram illustrating a known process for making purchaser payments with a traditional payment instrument and computer network payment system.
Figure 2A:
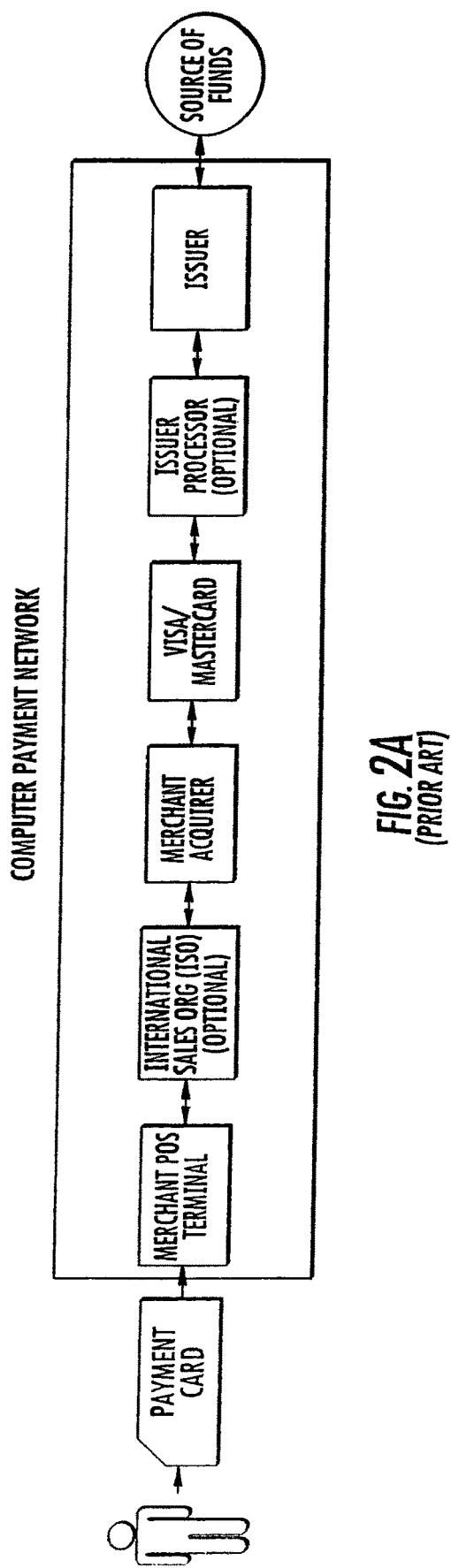
FIG. 2A is a flow diagram which expands upon the existing computer payment system infrastructure of FIG. 1 and is an example of a credit or debit route for a typical VISA or MasterCard transaction.
Figure 2B:
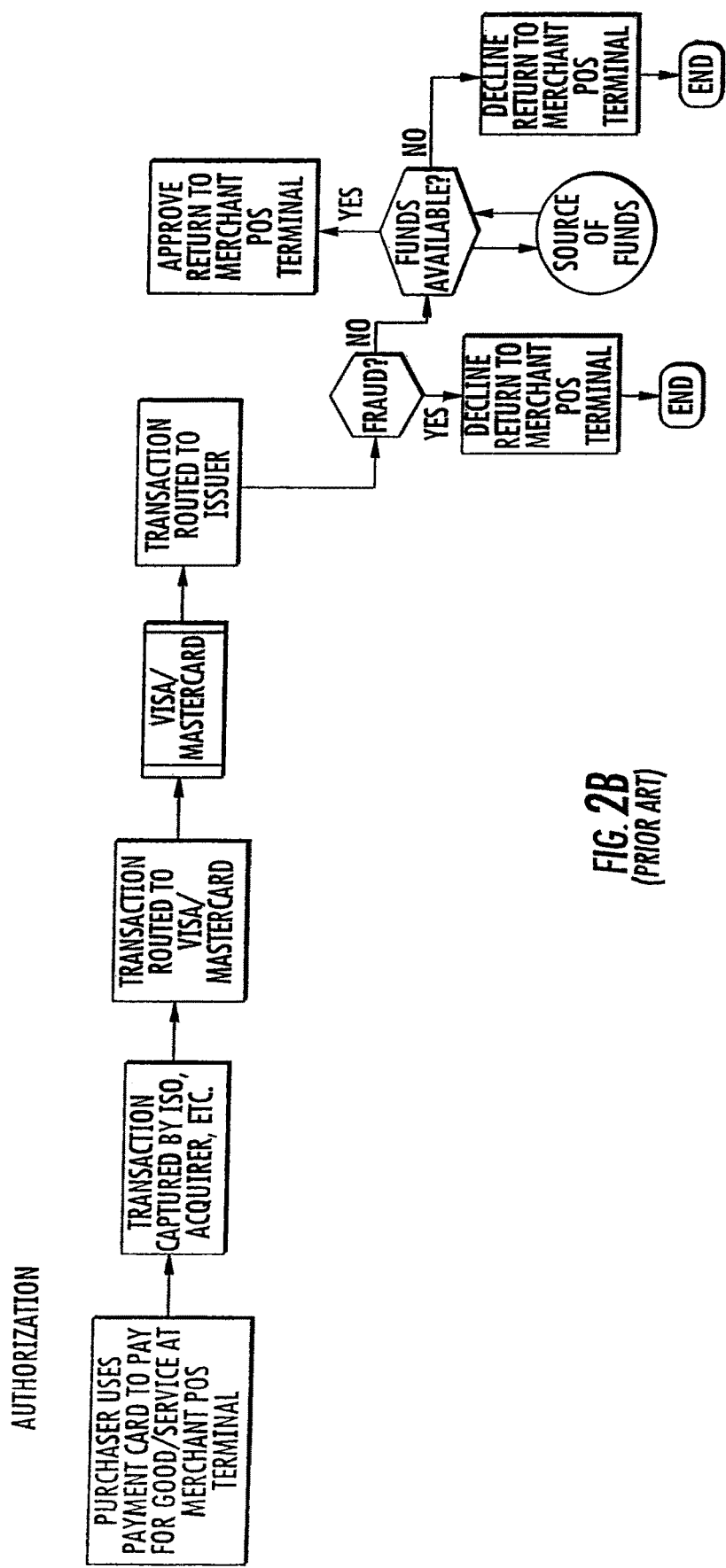
FIG. 2B is a flow diagram of the current industry process for authorization of a VISA/MasterCard transaction using a traditional payment card and computer network payment system.

The following detailed description of the embodiment(s) is merely exemplary in nature and is in no way intended to limit the invention, its application, or uses.

The present invention relates to a computer system and computer-implemented method for providing a payment vehicle holder with the ability to turn a payment vehicle an "on" and "off" (i.e. enable and disable) in an automated process and without human intervention by a bank, card issuer, or other institution. In accordance with the computer system and method, the holder of a payment vehicle sends instructions from a remote device to the computer system to turn its payment vehicle "on" when it is ready to be used and to turn its payment vehicle "off" to prevent use when the holder of the payment vehicle so chooses. The use to be prevented may either be of the payment vehicle holder itself or to prevent unauthorized use by another.

The present invention provides a way in which a holder of a payment vehicle, preferably a customer of the card issuer, can exert leverage or control over its payment vehicle.

A payment vehicle, as referred to herein, refers to an instrument used to conduct a payment transaction excluding cash. Examples of payment vehicles suitable for use in the present invention include, but are not limited to, a debit card, credit card, pre-paid card, stored value card, automated teller machine (ATM), wire, automated clearinghouse (ACH), online banking, online bill pay, and internet payment account. The payment vehicle of the present invention may be extended to other online payment services or instruments.

For example, a payment vehicle holder uses a device such as a personal data assistant (PDA) or a cell phone to send a text message or electronic mail to the computer system of the bank or other institution that issued the payment vehicle such as a payment card to the cardholder. The text message or electronic mail states, for example, "card on", "card off", or check the status of the payment card.

The payment vehicle holder keeps the payment vehicle "off" and then sends a text message or electronic mail to the payment vehicle issuer to turn it "on" for any number of reasons or at any time the holder of the payment vehicle so chooses. Likewise, a text message or electronic mail can be sent to turn it back "off" when done. Unlike existing systems, the default in the computer system of the present invention is that the payment vehicle is turned "off." There are any number of methods that are able to be used to notify to turn the payment vehicle "on" and "off" within the scope of the present invention. A text message and electronic mail are non-limiting examples.

The payment vehicle holder can establish or set rules with the card issuer as to when the card is to be turned "on" or "off." The holder of the payment vehicle can check card status at any time. The payment vehicle can be set to have time-based access. For example, rules may be set by time period such as the payment vehicle holder instructs to turn the payment vehicle off from 11 pm to 8 am daily. Another example is that the payment vehicle can be turned on or off based upon a specified transaction type such as by a merchant category code. Still yet another example is that the payment vehicle holder could determine that the payment vehicle only is "on" for gas and grocery purchases but "off" for internet purchases, international purchases, among others. Any number of rules could be set alone or in combination. Another example is that the payment vehicle can be turned on or off based upon country code.

In addition, the present invention relates to a payment vehicle having the "on" and "off" feature such as where the payment vehicle is an online banking account having established rules for when access is turned on and off. For example, the holder of the online banking account could set a rule that there can be no payments made using the online banking account, for example, between 11 pm and 8 am daily. Alternatively, the online banking account can be set such that fund status can be viewed but funds cannot be moved or transferred.

The "on" and "off" feature could be utilized in an authorization environment or in an environment where authorizations are not utilized. An important aspect to the present invention is the "on" and "off" functionality and the ability to give a payment vehicle holder who is typically a customer of a financial institution control of the payment vehicle in a computer-based network system leveraging that functionality.

The logic which is the basis for the "on" and "off" functionality in the computer-based network system is comprised within the payment vehicle's processing environment. The following non-limiting example relates to the processing of credit cards and debit cards although the logic is readily applied to other types of payment vehicles.

As mentioned previously, a typical credit card transaction involves a two-part transaction, namely authorization and settlement. During authorization, the question is asked if the money or funds are there and the question is asked if the card is valid. It can be a signature-based transaction or a PIN-based transaction. A pin-based transaction is a transaction in which authorization and settlement occur at same time. The method of authorization is card specific and is known in the industry. For example, VISA has a different payment network than other card providers. With the payment vehicle having the "on" and "off" feature of the present invention, the merchant would know that an invalid card is turned "off" for purposes of the transaction.

Settlement processing occurs with purchases made by internet, mail order, phone order, or card on file. Some of these go through an authorization transaction coming in looking for settlement from a merchant. A payment vehicle having the "on" and "off" feature of the present invention could be used in these transactions as well as other transactions that may involve interlink, automated teller machine (ATM), ACH, wires and others.

Figure 3:
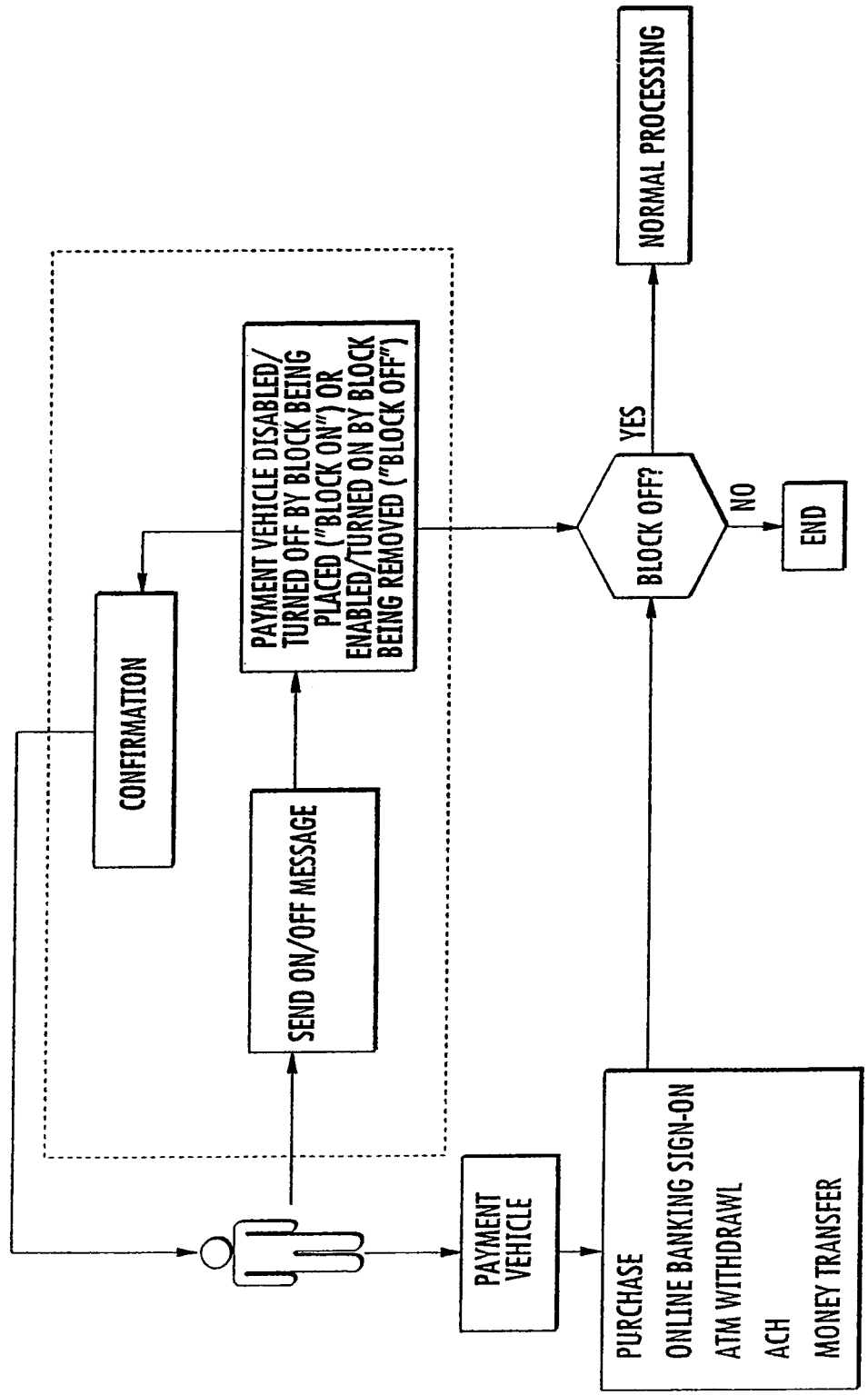
FIG. 3 is a flow diagram of the overall system and method of the present invention.

Referring now to the figures, FIG. 3 is a flow diagram illustrating the overall system and method of the present invention. As shown in FIG. 3, a payment vehicle holder sends an "on" or "off" message regarding its payment vehicle. After receipt of the message, the payment vehicle is either disabled (i.e. turned off) by a block being placed or enabled (i.e. turned on) by a block being removed. A confirmation of whether the block is on or off is electronically sent to the payment vehicle holder. The payment vehicle holder uses its payment vehicle to for example, make a purchase, sign-on to online banking, make an ATM withdrawal, make an ACH deposit, or money transfer. It is checked to see if the block is off for the payment vehicle. If the block is not off, the transaction ends. If the block is off, the transaction proceeds through normal processing for that respective payment vehicle.

Figure 4A:
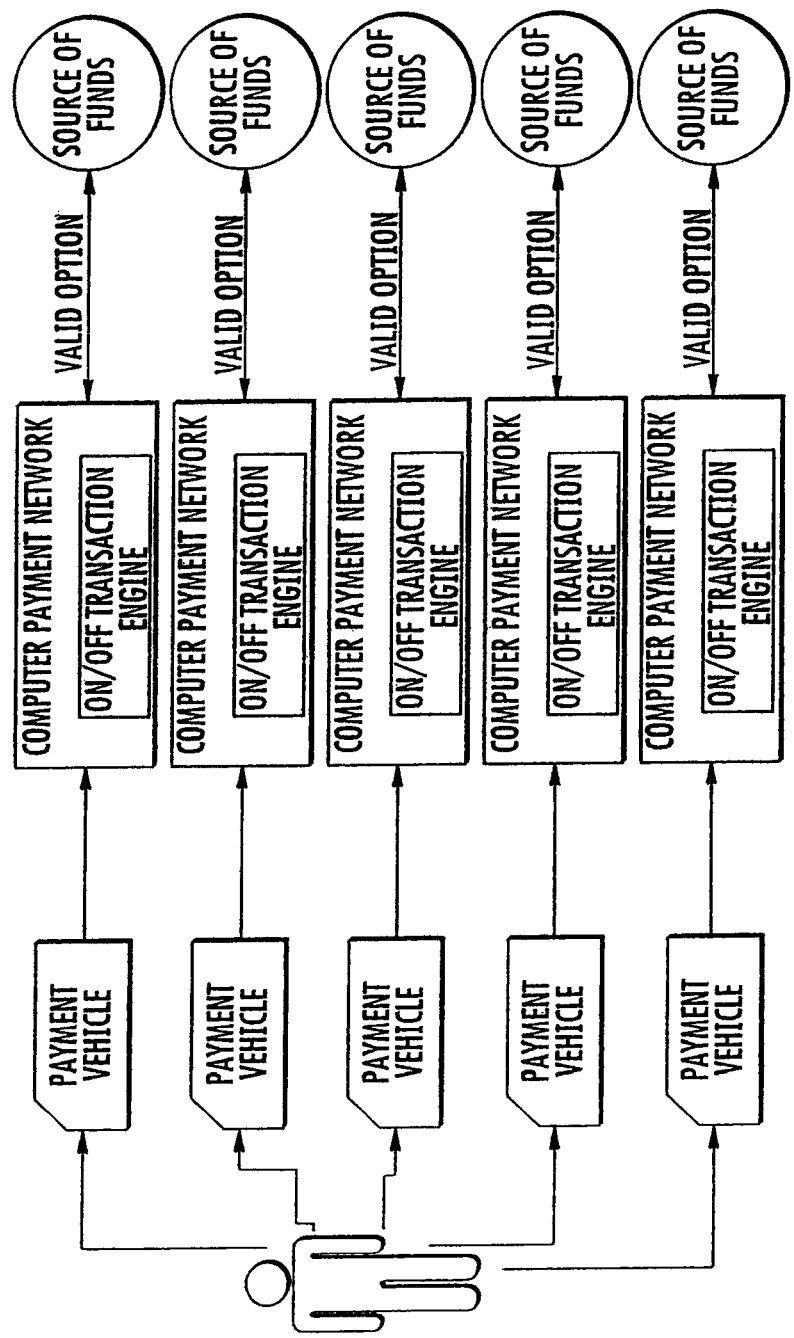
FIG. 4A is a flow diagram of the authorization process for a payment transaction using a payment vehicle having the on and off feature of the present invention.

FIG. 4A illustrates a payment vehicle having an "on" and "off" feature in accordance with the present invention for use in a computer-based environment for processing electronic payment transactions. As shown in FIG. 4A, the computer system comprises a payment vehicle, a computer payment network comprising an "on" and "off" transaction engine, and a source of funds. Preferably, the user is the holder of the payment vehicle; however, it is within the scope of the present invention that someone other than the payment vehicle holder would use the payment vehicle to make a purchase or to access funds. The "on" and "off" transaction engine further comprises the "on" and "off" logic to determine whether or not the payment vehicle is enabled or disabled (i.e. "on" or "off") prior to a payment transaction. If the payment vehicle is "on" and a transaction is enabled (i.e. not disabled or blocked), it is a valid option and the computer payment network is connected to the source of funds. Each user potentially has access to multiple payment vehicles having this "on" and "off" functionality.

Figure 4B:
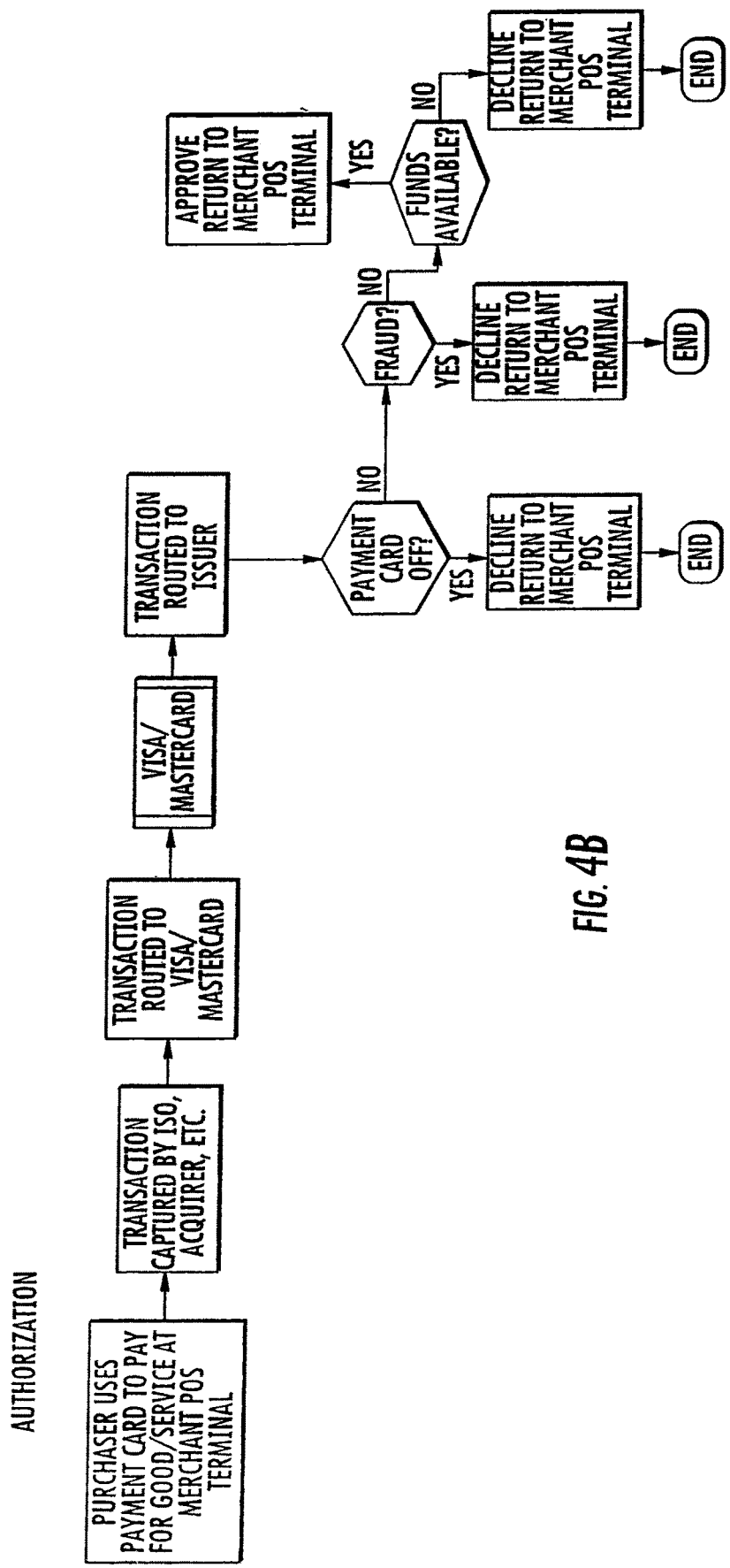
FIG. 4B is a flow diagram illustrating the overall environment in which the computer-based payment system and payment vehicle of the present invention operates.

FIG. 4B is a flow diagram of the authorization process for a payment transaction using a payment vehicle having the "on" and "off" feature of the present invention. As shown in FIG. 4B, a purchaser uses a payment card to pay for goods and services at a merchant point of sale terminal. The transaction is captured by the ISO or merchant acquirer. The transaction is routed to VISA/Mastercard. From VISA/Mastercard, the transaction is routed to the issuer. The "on" and "off" transaction engine of the computer payment network queries whether the payment card is "off." If it is "off," the transaction is declined and returned to merchant point of sale terminal. If the payment card is not "off," it is further processed to determine if there is fraud associated with the transaction. If there is fraud, the transaction is declined and returned to merchant point of sale terminal. If there is no fraud, the computer payment network checks to see if funds are available. If funds are available, the transaction is approved and returned to merchant point of sale terminal. If funds are not available, the transaction is declined and returned to merchant point of sale terminal.

Figure 4C:
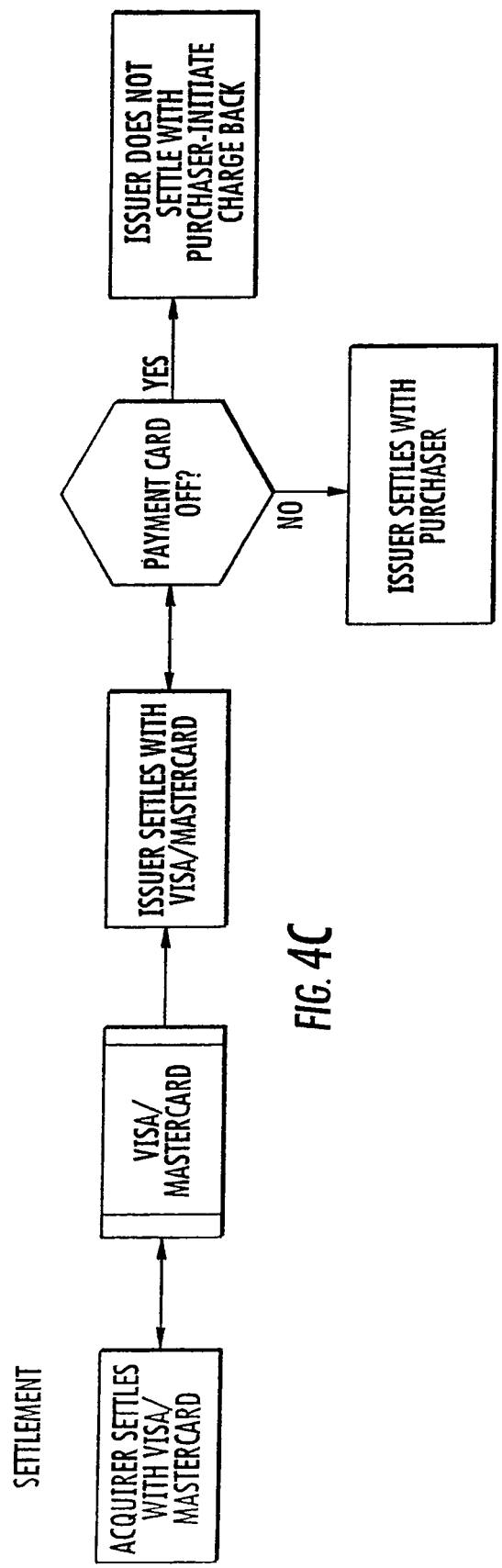
FIG. 4C is a flow diagram illustrating the settlement process for a payment transaction using a payment vehicle having the on and off feature of the present invention.

FIG. 4C is a flow diagram illustrating the settlement process for a payment transaction using a payment vehicle having the "on" and "off" feature of the present invention. As shown in FIG. 4C, the merchant acquirer settles with VISA/Mastercard. From VISA/Mastercard, the issuer settles with VISA/Mastercard. The "on"/"off" transaction engine queries whether the payment card is "off." If the payment card is not "off," the issuer settles with the purchaser. If the payment card is "off," the issuer does not settle with the purchaser and initiates charge back to the card.

As discussed herein, a payment vehicle having the "on" and "off" feature of the present invention allows the holder of the payment vehicle to remotely enable or disable its payment vehicle. The present invention provides a payment vehicle holder such as a customer of a financial institution control over its payment vehicle through leveraging of the "on" and "off" logic that may be transmitted, for example, via text message, e-mail, or other electronic means. While the present invention may be run in a variety of settings, it is advantageous for its logic to be run in a card processing environment.

There are numerous other features that are optionally associated with a payment vehicle having the "on" and "off" feature of the present invention. For example, a payment vehicle holder such as a customer of a financial institution is able to get the latest status of his or her payment vehicle. For example, the status may be enabled or disabled as well as more detailed reporting. This core functionality leads to additional features as described below.

Among the features of the present invention include time based access to the payment vehicles. For example, the payment vehicle is enabled from x time to y time. This may also be used for online banking access also.

A two credit/debit level authorization per transaction is another feature. For example, a customer will receive a communication, including but not limited to, a short message service (sms), a phone recording, or email verifying that it is permissible to allow the transaction.

Another feature of the payment vehicle of the present invention provides for the holder of the payment vehicle to refuse or stop a transaction that exceeds a predefined amount. The user may also refuse or stop a transaction of a specific type or limit the use of the payment vehicle to transactions of a certain type or merchant category code.

Yet another feature of the payment vehicle of the present invention is confirmation messaging. The payment vehicle holder receives a communication, including but not limited to, a sms, a phone recording, or email verifying that the payment vehicle holder's request to turn the payment vehicle on or off has been accomplished.

Still yet another feature of the payment vehicle of the present invention is vendor messaging. For example, when a person attempts to use a payment vehicle that has been turned off, the vendor receives a message informing him or her that the card is rejected as it is turned off.

It is within the scope of the present invention that this "on" and "off" feature associated with a payment vehicle is applicable to both existing and new customers, for example, of an institution such as a financial institution that is a card issuer. A customer enrolls for such a program and his/her account is marked accordingly. A customer selects a card account and agrees to use a card having the "on" and "off" feature. A customer then receives notification of enrollment, instructions, and initial card status. Such functionality is comprised, for example, in a card on/off transaction engine.

Thus, the payment vehicle of the present invention is advantageous for many reasons including because it provides additional security for payment vehicles. The payment vehicle of the present invention having the "on" and "off" feature permits customers to easily manage the security of their payment vehicles by switching them off when not in use. With the present invention, it is possible to disable the payment vehicle, such as a credit card, for safety or other purposes whenever the holder of a payment vehicle so chooses. For example, messaging is accomplished by sms or email.

Another advantage of the payment vehicle and method of the present invention is that it enhances loyalty through appreciation for the additional security, flexibility, and control that it provides consumers over their payment vehicles.

In accordance with aspects of the present invention, the computer system of the present invention comprises a computer having memory and a processor for processing input data received from a remote device, a computer software application for use by the computer in processing the input data, and a computer output display device in communication with the computer for providing output data. The memory comprises instructions executable by the processor.

The computer processor, memory and computer software application(s) of the computer system are used to process and analyze the input data, among other factors. The computer software application comprises automated decision rules and computer-implemented algorithms which are used to, for example, estimate, calculate and generate recommendations.

Figure 5:
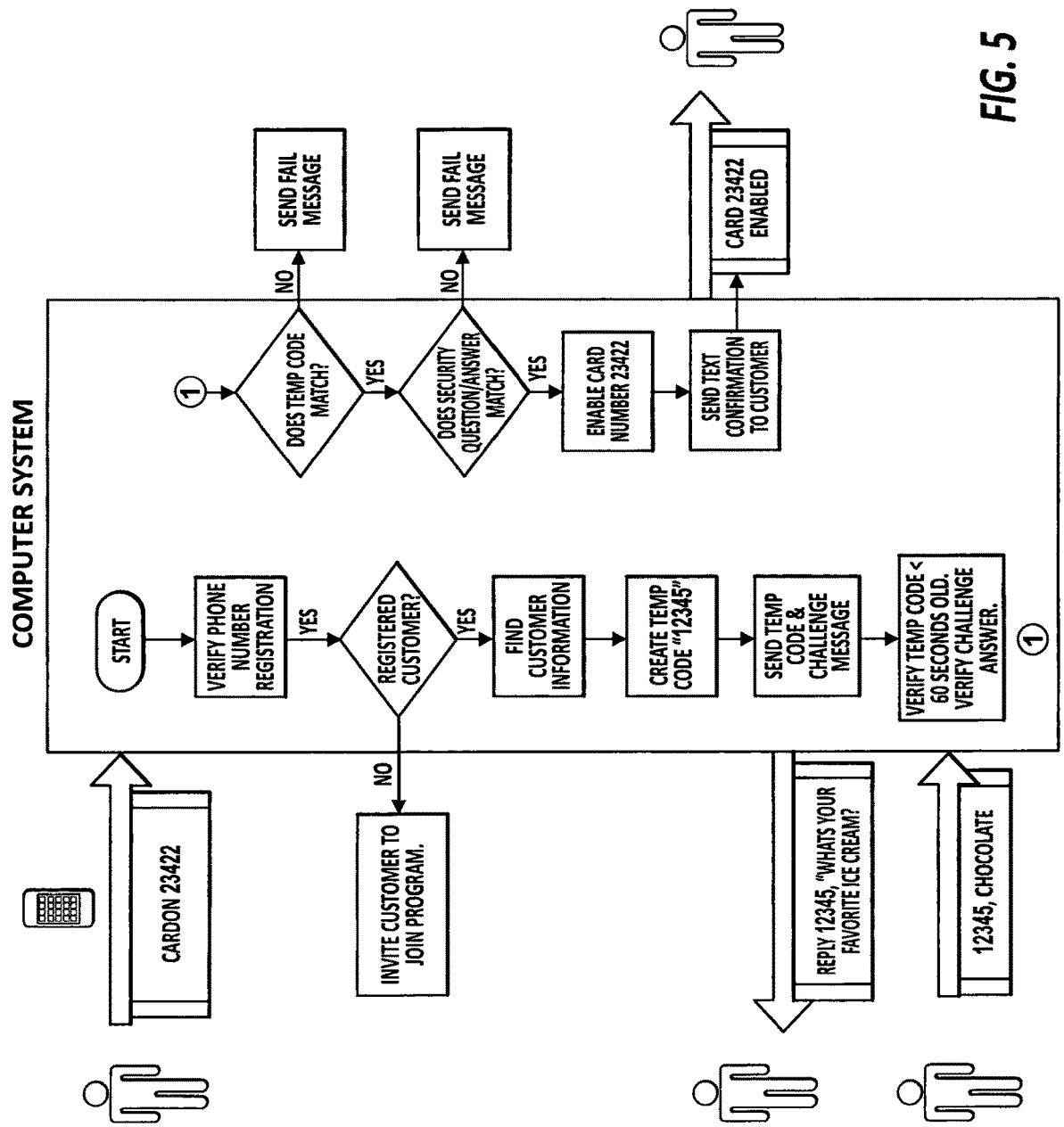
FIG. 5 is a flow diagram illustrating the method employed by the computer system to enable a payment card in accordance with aspects of the present invention.
Figure 6:
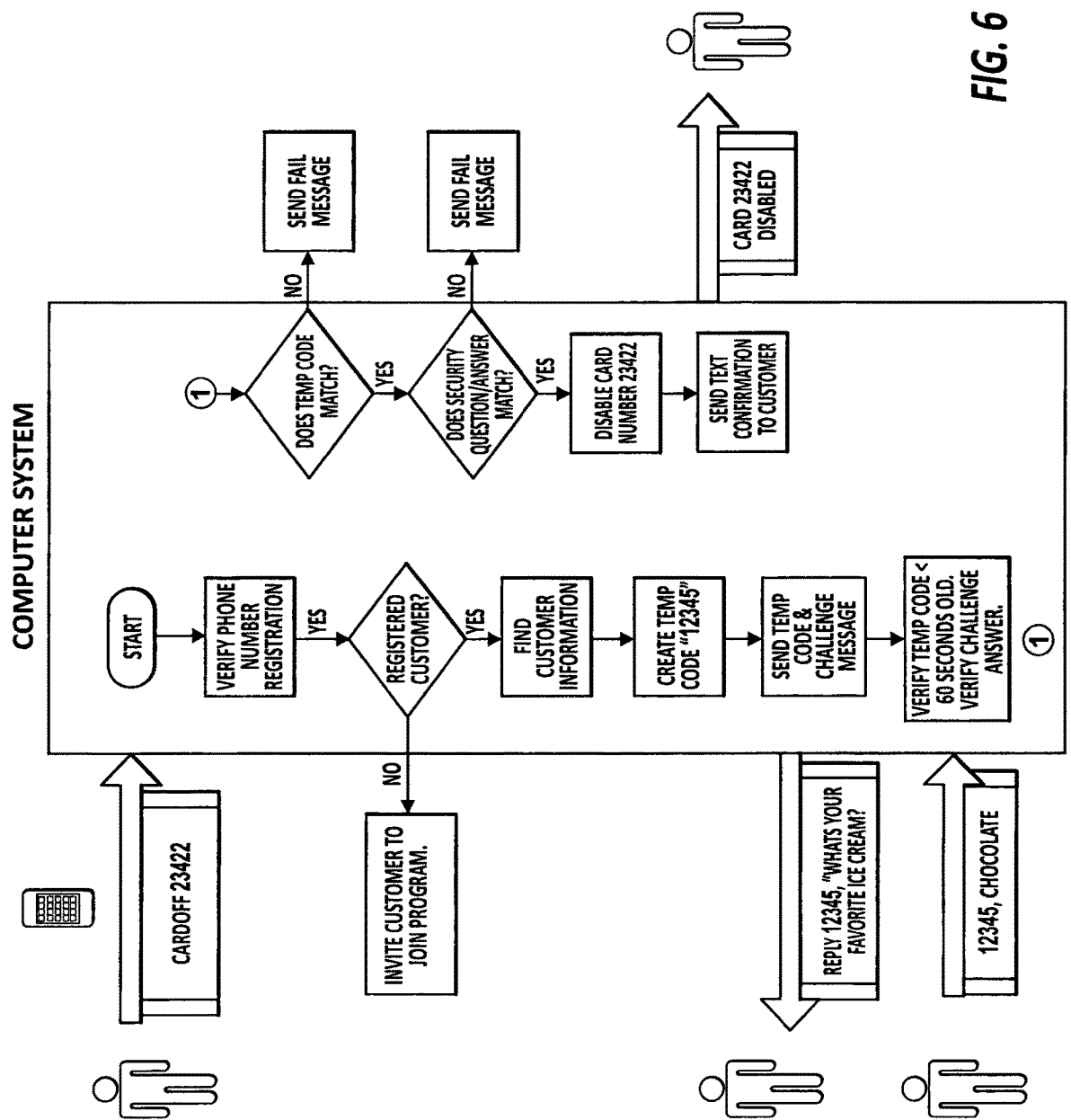
FIG. 6 is a flow diagram illustrating the method employed by the computer system to disable a payment card in accordance with aspects of the present invention.
Figure 7:
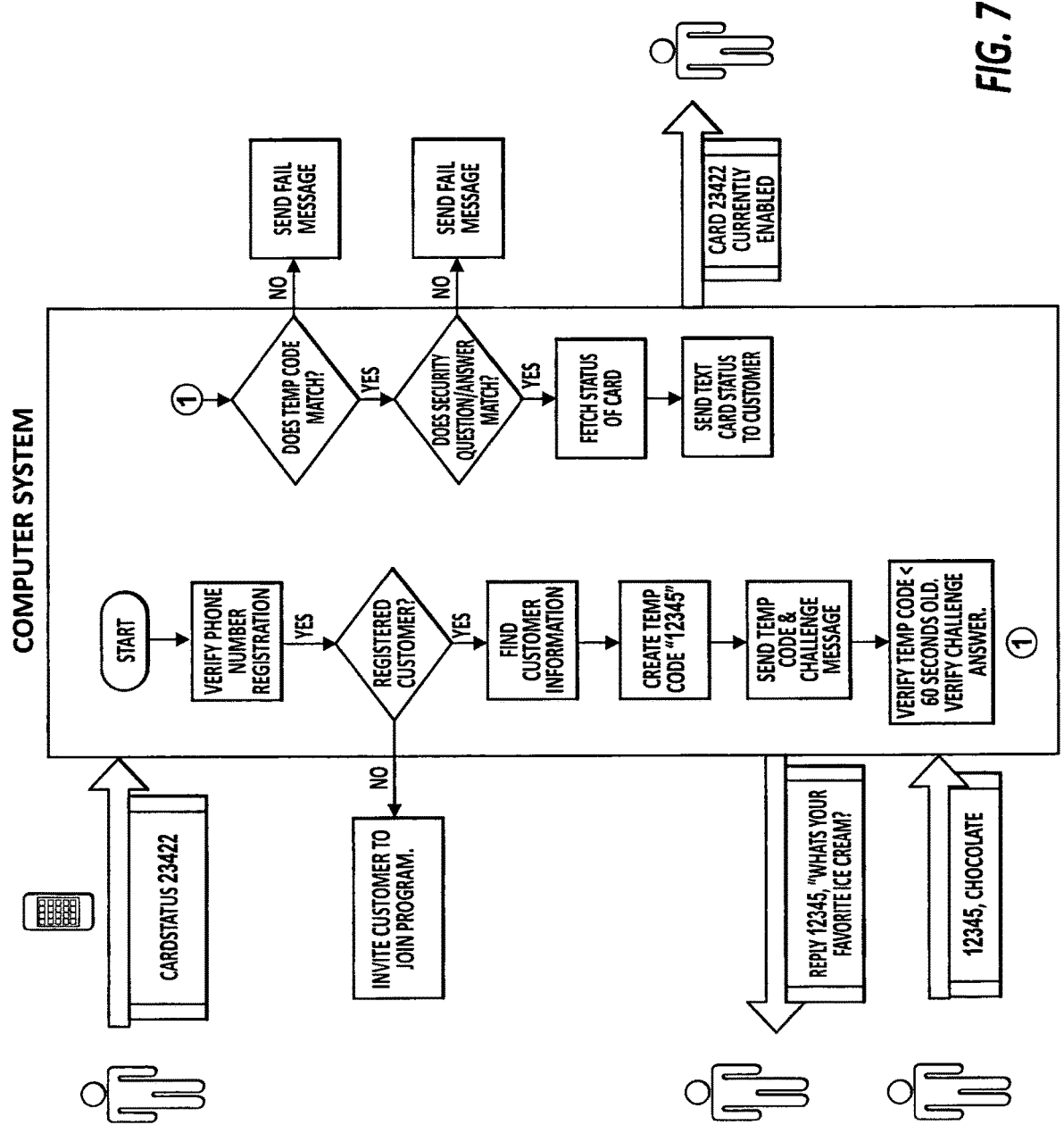
FIG. 7 is a flow diagram illustrating the method employed by the computer system to check the status of a payment card.

In accordance with aspects of the present invention, a computer-implemented and automated method is provided for a payment vehicle holder to manage his/her own payment vehicle status without human intervention on the part of a payment vehicle provider. In accordance with the computer-implemented method, the computer system enables a payment vehicle by removing a block placed on the payment vehicle by a transaction engine in the payment network at the request of the payment vehicle holder. The payment vehicle is enabled without human intervention on the part of a bank, card issuer, or other institution. FIG. 5 sets forth a flow diagram illustrating the method employed by the computer system and the executable instructions by which the computer system turns "on" or enables a payment card. FIG. 6 sets forth a flow diagram illustrating the method employed by the computer system and the executable instructions by which the computer system turns "off" or disables a payment card. FIG. 7 sets forth a flow diagram illustrating the method employed by the computer system and the executable instructions by which the computer system checks the status of a payment card.

As shown in FIG. 5, the computer system receives input data such as a text message stating "cardon 23422" transmitted from a mobile device or other remote device of a customer or payment vehicle holder. The text message and mobile device phone number are used to identify the customer or payment vehicle holder and to provide an instruction as to whether the payment vehicle such as a credit card is to be turned on or off. The computer system verifies identifying information such as the phone number of the device to see if the input data is being received from a registered customer or registered payment vehicle holder. If not registered, the payment vehicle holder is invited to sign-up and join the program administered by the bank or other institution that utilizes the computer system. If registered, the computer system finds the relevant customer information. The computer system creates a temporary code such as "12345". The computer system sends a reply text message to the mobile device with the temporary code and a dynamic challenge question such as "What is your favorite ice cream?" The mobile device sends a reply message with the temporary code and an answer to the challenge question such as "chocolate." The computer system verifies that the temporary code is being received in less than a predetermined time interval, such as a minute, after the temporary code is sent and also verifies the challenge answer. The computer system then checks to see if the temporary code matches. If temporary code does not match, a fail message is sent to the device. If temporary code matches, then the question and answer to the security question is checked to see if it is a match. If not, a fail message is sent to the device. If yes, the payment vehicle is enabled (enable card 23422). The computer system sends a text confirmation to the device of the user or customer and the payment vehicle such as "23422" is enabled.

As shown in FIG. 6, the computer system receives input data such as a text message stating "card off 23422" transmitted from a mobile or other remote device of a customer or payment vehicle holder. The text message and mobile device phone number are used to identify the customer or payment vehicle holder and to provide an instruction as to whether the payment vehicle such as a credit card is to be turned on or off. The computer system verifies identifying information such as the phone number of the device to see if the input data is being received from a registered customer or registered payment vehicle holder. If not registered, the payment vehicle holder is invited to sign-up and join the program administered by the bank or other institution that utilizes the computer system. If registered, the computer system finds the relevant user information. The computer system creates a temporary code such as "12345". The computer system sends a reply text message to the mobile device with the temporary code and a dynamic challenge security question such as "What is your favorite ice cream?" The mobile device sends a reply message with the temporary code and an answer to the challenge question such as "chocolate." The computer system verifies that the temporary code is being received in less than a predetermined time interval, such as a minute, after the temporary code is sent and also verifies the challenge answer. The computer system then checks to see if the temporary code matches. If temporary code does not match, a fail message is sent to the device. If temporary code matches, then the question and answer to the security question is checked to see if it is a match. If no, a fail message is sent to the device. If yes, the payment vehicle is disabled (disable card 23422). The computer system sends a text confirmation to the device of the user or customer and the payment vehicle such as "23422" is disabled.

As shown in FIG. 7, the computer system receives input data such as a text message stating "card status 23422" transmitted from a mobile or other remote device of a customer or payment vehicle holder. The text message and mobile device phone number are used to identify the customer or payment vehicle holder. The computer system verifies identifying information such as the phone number of the device to see if the input data is being received from a registered customer or registered payment vehicle holder. If not registered, the user is invited to sign-up and join the program administered by the bank or other institution that utilizes the computer system. If registered, the computer system finds the relevant user information. The computer system creates a temporary code such as "12345". The computer system sends a reply text message to the mobile device with the temporary code and a dynamic challenge question such as "What is your favorite ice cream?" The mobile device sends a reply message with the temporary code and an answer to the challenge question such as "chocolate." The computer system verifies that the temporary code is being received in less than a predetermined time interval, such as a minute, after the temporary code is sent and also verifies the challenge answer. The computer system then checks to see if the temporary code matches. If temporary code does not match, a fail message is sent to the device. If temporary code matches, then the question and answer to the security question is checked to see if it is a match. If no, a fail message is sent to the device. If yes, the status of the payment card is obtained and the computer system sends a text to the device of the user or customer with the status of the payment card such as "card 23422 currently enabled."

In another aspect of the present invention, a remote interface is provided for a user or payment vehicle holder to view and to manage his/her payment vehicle status. The remote interface is a computer software application that provides a visual interface for a user or payment vehicle holder to monitor and modify one or more payment vehicles. A user or payment vehicle holder is able to view and, at a glance, understand the current status of all payment vehicles. A user is able to use the remote computer software interface to enable or disable one or more payment vehicles at the same time without human intervention on the part of one or more payment vehicle providers. Thus, a payment vehicle is able to be monitored and affected across multiple financial institutions without any human intervention on the part of the provider to affect payment vehicle status.

The remote interface is a computer software application that is accessible on a web site, mobile device application, or tablet application, for example.

Figure 8:
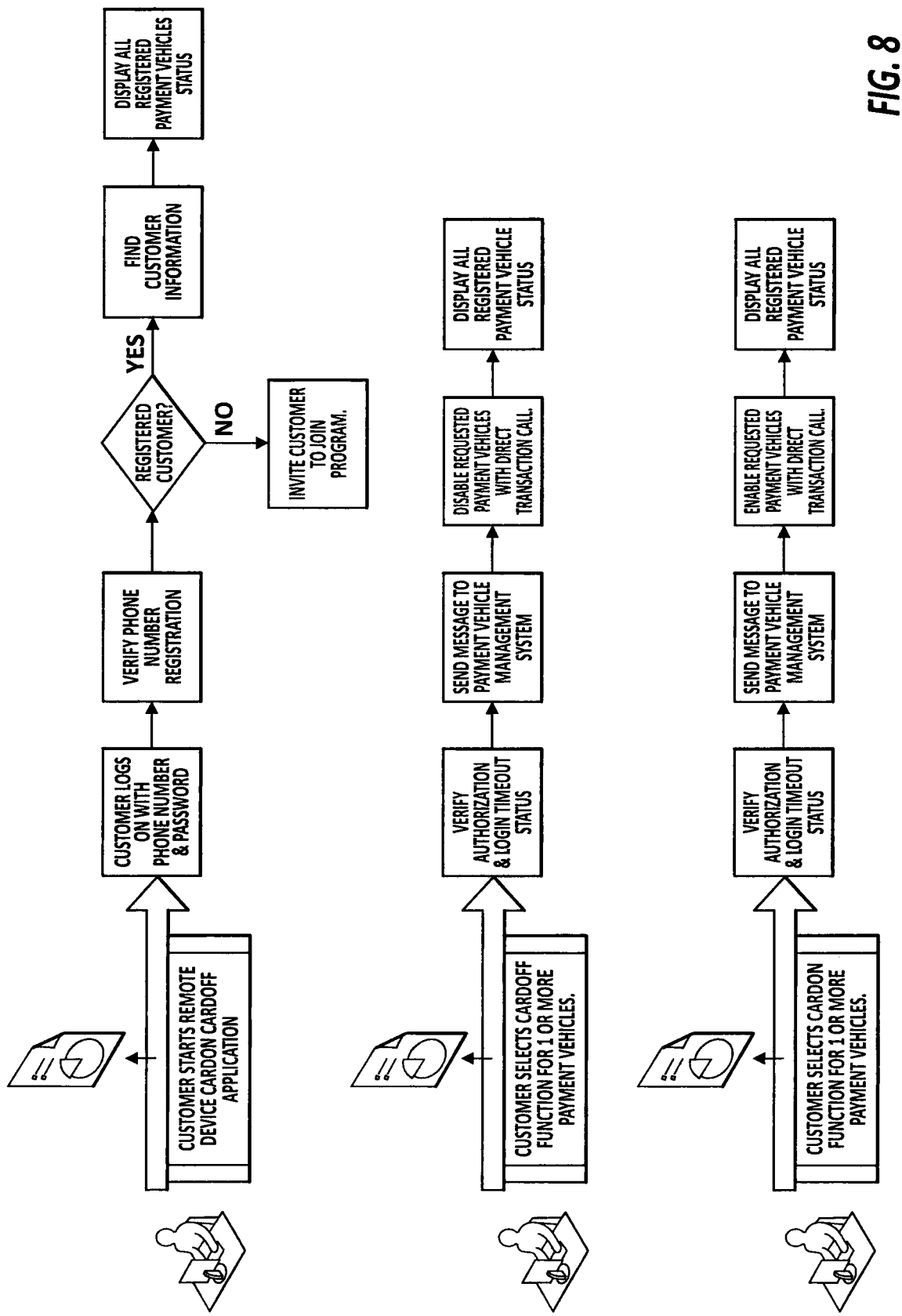
FIG. 8 is a flow diagram illustrating a customer using a remote interface computer software application in accordance with aspects of the present invention.

FIG. 8 is a flow diagram illustrating a customer using the remote computer software interface of the present invention. For example, as shown, a customer starts the remote device card on/card off application. The customer logs in with a phone number and password, the computer system verifies the phone number registration. If not a registered customer, the customer is invited to join the program. If registered, the computer software finds the customer's information and displays the registered status of all payment vehicles of the customer. Also, as shown in FIG. 8, a customer selects the "card off" option for one or more payment vehicles using the remote computer software application. The computer system verifies the authorization and login timeout status. The computer system sends a message to the payment vehicle management system. Disablement of requested payment vehicles is made with a direct transaction call. In other words, the computer system transaction that disables the payment vehicle is run based on a text message received directly from user. The computer system then displays the status of all registered payment vehicles. Also as shown in FIG. 8, a customer selects the "card on" option for one or more payment vehicles using the remote computer software application. The computer system verifies the authorization and login timeout status. The computer system sends a message to the payment vehicle management system. Enablement of requested payment vehicles is made with a direct transaction call. In other words, the computer system transaction that enables the payment vehicle is run based on a text message received directly from user. The computer system then displays the status of all registered payment vehicles.

Figure 9:
FIG. 9 is an illustration of a computer screenshot depicting the information displayed to a payment card holder when using a remote interface in accordance with aspects of the present invention.
Figure 9:
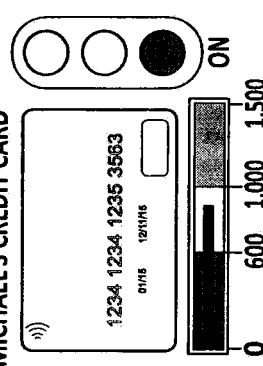
Figure 9:
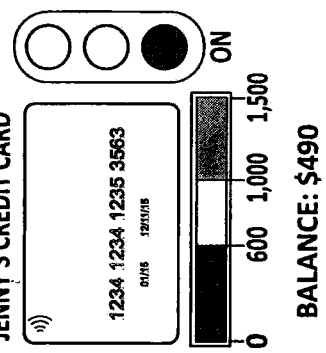
Figure 9:
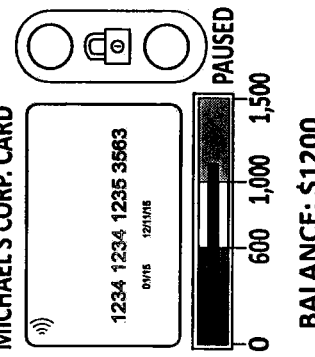
Figure 9:
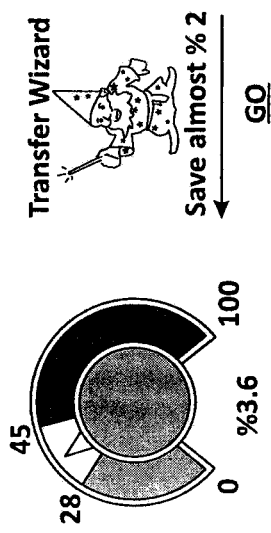
Figure 9:
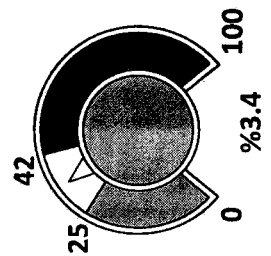
Figure 9:
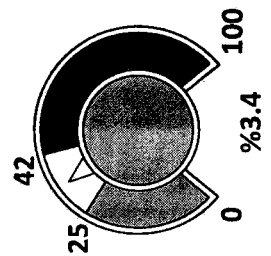
Figure 9:
Figure 9:
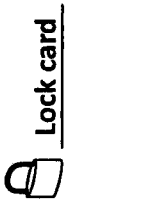
Figure 9:

The computer processor and computer software application process and compute the input data in the computer system to generate output data. The output data is transmitted to a computer output display device such as a computer display terminal. The output data includes, but is not limited to, card status as on or off, balance information, payment vehicle information, among other information. The output data is presented in numerous formats including, but not limited to, graphical representations as shown in FIG. 9. FIG. 9 illustrates a computer screenshot that depicts the information displayed to a customer or payment vehicle holder when using the remote computer software application interface. As shown in FIG. 9, GPS discount awareness and other features shown represent transactions and awareness of customer's mobile phone or remote device location and card status.

Thus, a customer is able to check the status of a payment vehicle such as a credit card remotely through a remote interface on a telecommunications device. A customer is also able to enable or disable a payment vehicle pursuant to an instruction via a mobile or other telecommunications device and subject to an approved challenge security response. An instruction such as a text message from a payment vehicle holder effects a change in status of the payment vehicle without any interaction from a bank representative. Thus, in the automated system of the present invention, a novel feature is that a customer manages his/her own card status, not the provider.

It is to be understood that depicted architectures for the computer system and system environment are merely examples and that many other architectures can be implemented which achieve the same functionality.

The foregoing detailed description has set forth various aspects of the present invention via the use of block diagrams, flow charts, and examples. It will be understood by those in the art that each block diagram component, flow chart step, operation and/or component illustrated by the use of examples can be implemented, individually and/or collectively, by a wide range of hardware, software, firmware, or any combination thereof.

The present invention has been described in the context of a fully functional computer system, however, those skilled in the art will appreciate that the present invention is capable of being distributed as a program product or implemented in a variety of forms.

The above discussed embodiments include software modules that perform certain tasks. The software modules discussed herein may include script, batch or other executable files. The software modules may be stored on a machine-readable or computer-readable storage medium such as a disk drive. Storage devices used for storing software modules in accordance with the present invention include, but are not limited to, floppy disks, hard disks, and optical disks. The modules may be stored within a computer system memory to configure the computer system to perform the functions of the module. Other types of computer-readable storage media may be used to store the modules discussed herein.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A method, implemented by a computer system, the method comprising:
    serving, by the computer system, a website to a computing device over a telecommunications network;
    presenting, by the computer device and on the website, a visual interface that:
        identifies a credit card,
        graphically indicates a card-on status that enables the credit card for electronic payments, and
        provides a selectable icon for disabling the credit card;
    receiving, by the computer device and via the website, a first selection submitted via the selectable icon to disable the credit card;
    disabling, by the computer system, the credit card based on the first selection such that the credit card has a card-off status that disables the credit card for subsequent electronic payments;

modifying, by the computer system, the visual interface to graphically indicate that the credit card has the card-off status; and declining, by the computer system based on the card-off status, an electronic payment being processed with the credit card subsequent to the first selection.

2. The method of claim 1, further comprising:

receiving, by the computer system and via the website, a second selection submitted via the selectable icon to enable the credit card; and modifying, by the computer system, the visual interface to graphically indicate the credit card has the card-on status that enables the credit card for subsequent electronic payments.

3. The method of claim 2, further comprising authorizing, by the computer system based on the card-on status, a second electronic payment being processed with the credit card subsequent to the second selection.

4. The method of claim 1, wherein the visual interface further identifies a second credit card and indicates a second card-off status that disables the second credit card for electronic payments.

5. The method of claim 4, wherein the visual interface further graphically presents a second selectable icon for enabling the second credit card, and wherein the method further comprises receiving, by the computer system, a third selection to enable the second credit card for subsequent electronic payments.

6. The method of claim 1, further comprising receiving and verifying, by the computer system, login credentials entered into the website via the computing device before graphically identifying the credit card and graphically indicating the card-on status of the credit card.

7. The method of claim 1, wherein the visual interface further graphically presents an account balance of the credit card.

8. The method of claim 1, wherein disabling the credit card comprises transmitting, by the computer system in response to the first selection, a first message to a payment vehicle management system to disable the credit card.

9. The method of claim 8, wherein the computing device is a mobile computing device, the method further comprising:

receiving, by the payment vehicle management system after receiving the first message from the computer system, a first text message from the mobile computing device to disable the credit card; and disabling, by the payment vehicle management system, the credit card in response to the first text message.

10. The method of claim 1, wherein the visual interface further graphically presents a GPS awareness icon based on a current location of the computing device.

11. The method of claim 1, wherein the computing device is a mobile computing device, and wherein the website further provides a coupon based on a current location of the mobile computing device.

12. A method, implemented by a computer system, the method comprising:

graphically presenting, by the computer system, on an output display device of a mobile computing device while the computing device accesses a remote interface provided by the computer system:

a first payment vehicle identifier for the first payment vehicle of the account holder, a first status indicator for the first payment vehicle that indicates the first payment vehicle has a first payment vehicle status that is enabled, and a first selectable icon for changing the first payment vehicle status;

receiving, by the computer system, a first selection submitted via the first selectable icon to disable the first payment vehicle, wherein the first status indicator in the visual interface is modified to indicate the first payment vehicle is disabled in response to the first selection; and declining, by the computer system, an electronic payment being processed with the first payment vehicle subsequent to the first selection.

13. The method of claim 12, further comprising graphically presenting:

a second payment vehicle identifier for a second payment vehicle of the account holder;

a second status indicator for the second payment vehicle that indicates the second payment vehicle has a second payment vehicle status that is disabled; and a second selectable icon for changing the second payment vehicle status.

14. The method of claim 12, further comprising:

verifying, by the computer system, authorization and login timeout status for the remote interface after receiving the first selection; and disabling, by the computer system, the first payment vehicle in response to verifying the authorization and login timeout status for the remote interface.

15. The method of claim 12, further comprising:

receiving, by the computer system after receiving the first selection, a first text message from the mobile computing device to disable the first payment vehicle; and disabling, by the computer system, the first payment vehicle in response to the first text message.

16. The method of claim 12, wherein the remote interface is a website served by the computer system.

17. The method of claim 12, wherein the remote interface is accessed using a mobile device application running on the mobile computing device.

18. The method of claim 12, wherein the method further comprises graphically presenting a GPS awareness icon based on a current location of the mobile computing device.

19. The method of claim 18, wherein the method further comprises providing a coupon based on the current location of the mobile computing device.

20. A computer system comprising a processor and memory with instructions executable by the processor, the instructions causing the computer system to:

serve, to a computing device over a telecommunications network, a website with a visual interface that:

graphically indicates a credit card has a card-on status that enables the credit card for electronic payments, and provides a selectable icon for disabling the credit card;

receive, via the website, a first selection submitted using the selectable icon to disable the credit card;

disable the credit card based on the first selection such that the credit card has a card-off status that disables the credit card for subsequent electronic payments; and decline, by the computer system based on the card-off status, an electronic payment being processed with the credit card subsequent to the first selection.

* * * * *